(12) United States Patent
Sato

(10) Patent No.: US 10,975,975 B2
(45) Date of Patent: Apr. 13, 2021

(54) VALVE DEVICE

(71) Applicant: DENSO CORPORATION, Kariya (JP)

(72) Inventor: Shingo Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 45 days.

(21) Appl. No.: 16/361,356

(22) Filed: Mar. 22, 2019

(65) Prior Publication Data

US 2019/0219179 A1    Jul. 18, 2019

Related U.S. Application Data

(63) Continuation of application No. PCT/JP2017/033801, filed on Sep. 20, 2017.

(30) Foreign Application Priority Data

Sep. 27, 2016 (JP) .............................. JP2016-187965
Aug. 30, 2017 (JP) .............................. JP2017-166230

(51) Int. Cl.

| *F16K 27/06* | (2006.01) |
| *F16K 11/087* | (2006.01) |
| *F16K 27/04* | (2006.01) |
| *F16K 11/076* | (2006.01) |
| *F16K 5/06* | (2006.01) |

(Continued)

(52) U.S. Cl.
CPC .............. *F16K 11/087* (2013.01); *F01P 7/14* (2013.01); *F16K 5/0689* (2013.01); *F16K 11/076* (2013.01); *F16K 11/0873* (2013.01); *F16K 27/04* (2013.01); *F16K 27/067* (2013.01); *F16K 31/535* (2013.01); *F01P 3/02* (2013.01);

(Continued)

(58) Field of Classification Search
CPC ........ F01P 3/02; F01P 7/165; F01P 2003/028; F01P 2060/04; F16K 5/0689; F16K 27/067; F16K 31/535

See application file for complete search history.

(56) References Cited

U.S. PATENT DOCUMENTS 3,595,270 A * 7/1971 McNeal, Jr. .......... F16K 11/202
                                                                137/575
3,900,401 A * 8/1975 Oliver .................... B01D 35/14
                                                                210/238

(Continued)

FOREIGN PATENT DOCUMENTS

| CN | 102483170 A | 5/2012 |
| JP | 2015-59615 | 3/2015 |

*Primary Examiner* — Matthew W Jellett
*Assistant Examiner* — Christopher D Ballman
(74) *Attorney, Agent, or Firm* — Nixon & Vanderhye P.C.

(57) ABSTRACT

A valve device includes a valve housing, a valve member, a limiter, a contact portion and a shaft. The valve housing has an inside space and a plurality of housing-side openings. The housing-side openings communicate between the inside space and an outside of the valve housing. The valve member is rotatably received in the valve housing and has: a plurality of valve-member-side openings, each of which is configured to communicate with a corresponding one of the housing-side openings; and a communication passage, through which the valve-member-side openings is communicated with each other. The limiter is configured to limit rotation of the valve member. The contact portion is provided in a space of the valve member and is configured to contact the limiter. The shaft rotatably supports the valve member.

73 Claims, 32 Drawing Sheets

(51) Int. Cl.
*F16K 31/53* (2006.01)
*F01P 7/14* (2006.01)
*F01P 7/16* (2006.01)
*F01P 3/02* (2006.01)

(52) U.S. Cl.
CPC ......... *F01P 7/165* (2013.01); *F01P 2003/028* (2013.01); *F01P 2060/04* (2013.01); *F16K 5/06* (2013.01)

(56) References Cited

U.S. PATENT DOCUMENTS

| | | | | |
|---|---|---|---|---|
| 5,443,722 A * | 8/1995 | Desai | ................ | B01D 29/35 137/625.21 |
| 5,617,815 A * | 4/1997 | Spies | ................ | F16K 11/076 123/41.1 |
| 6,197,195 B1 * | 3/2001 | Booth | ................ | B01D 29/35 210/340 |
| 6,539,899 B1 * | 4/2003 | Piccirilli | ................ | F01P 7/167 123/41.08 |
| 6,568,428 B2 * | 5/2003 | Pecci | ................ | F16K 27/003 137/595 |
| 6,681,805 B2 * | 1/2004 | McLane | ................ | B60H 1/00485 137/625.16 |
| 6,994,316 B2 * | 2/2006 | Pervaiz | ................ | F16K 5/0478 251/160 |
| 7,165,513 B2 * | 1/2007 | Humburg | ................ | B60H 1/00485 123/41.08 |
| 7,168,397 B2 * | 1/2007 | Chanfreau | ................ | B60H 1/00485 123/41.01 |
| 8,961,792 B2 * | 2/2015 | Desai | ................ | B01D 35/12 210/234 |
| 9,228,483 B2 * | 1/2016 | Kuze | ................ | F01P 7/14 |
| 9,500,299 B2 * | 11/2016 | Morein | ................ | F16K 11/0876 |
| 9,617,906 B2 * | 4/2017 | Lee | ................ | F16K 11/0876 |
| 9,803,764 B2 * | 10/2017 | Chang | ................ | F01P 7/14 |
| 9,897,217 B2 * | 2/2018 | Greene | ................ | F16K 5/201 |
| 10,280,829 B2 * | 5/2019 | Shen | ................ | F16K 31/042 |
| 2005/0252556 A1 * | 11/2005 | Williams | ................ | F15B 11/006 137/596.17 |
| 2011/0198525 A1 | 8/2011 | Yu | | |
| 2012/0118419 A1 | 5/2012 | Murray | | |
| 2015/0361865 A1 * | 12/2015 | Lee | ................ | F02M 26/28 123/41.08 |
| 2016/0010536 A1 * | 1/2016 | Murakami | ................ | F16K 11/076 137/625.44 |
| 2016/0109031 A1 * | 4/2016 | Greene | ................ | F16K 11/0876 251/314 |
| 2016/0363036 A1 * | 12/2016 | Imasaka | ................ | F16K 31/041 |

* cited by examiner

VALVE DEVICE

CROSS REFERENCE TO RELATED APPLICATIONS

This application is a continuation application of International Patent Application No. PCT/JP2017/033801 filed on Sep. 20, 2017, which designated the U.S. and claims the benefit of priority from Japanese Patent Application No. 2016-187965 filed on Sep. 27, 2016 and Japanese Patent Application No. 2017-166230 filed on Aug. 30, 2017. The entire disclosures of all of the above applications are incorporated herein by reference.

TECHNICAL FIELD

The present disclosure relates to a valve device.

BACKGROUND

Previously, there is known a valve device that includes a valve member and a valve housing. The valve housing rotatably receives the valve member. The valve device is configured to control a flow of fluid according to a rotational angle of the valve member relative to the valve housing.

SUMMARY

According to the present disclosure, there is provided a valve device that includes a valve housing, a valve member and a shaft. The valve housing has an inside space and a plurality of housing-side openings. The plurality of housing-side openings communicates between the inside space and an outside of the valve housing. The valve member is rotatably received in the valve housing. The valve member has: a plurality of valve-member-side openings, each of which is configured to communicate with a corresponding one of the plurality of housing-side openings; and a communication passage, through which the plurality of valve-member-side openings is communicated with each other.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
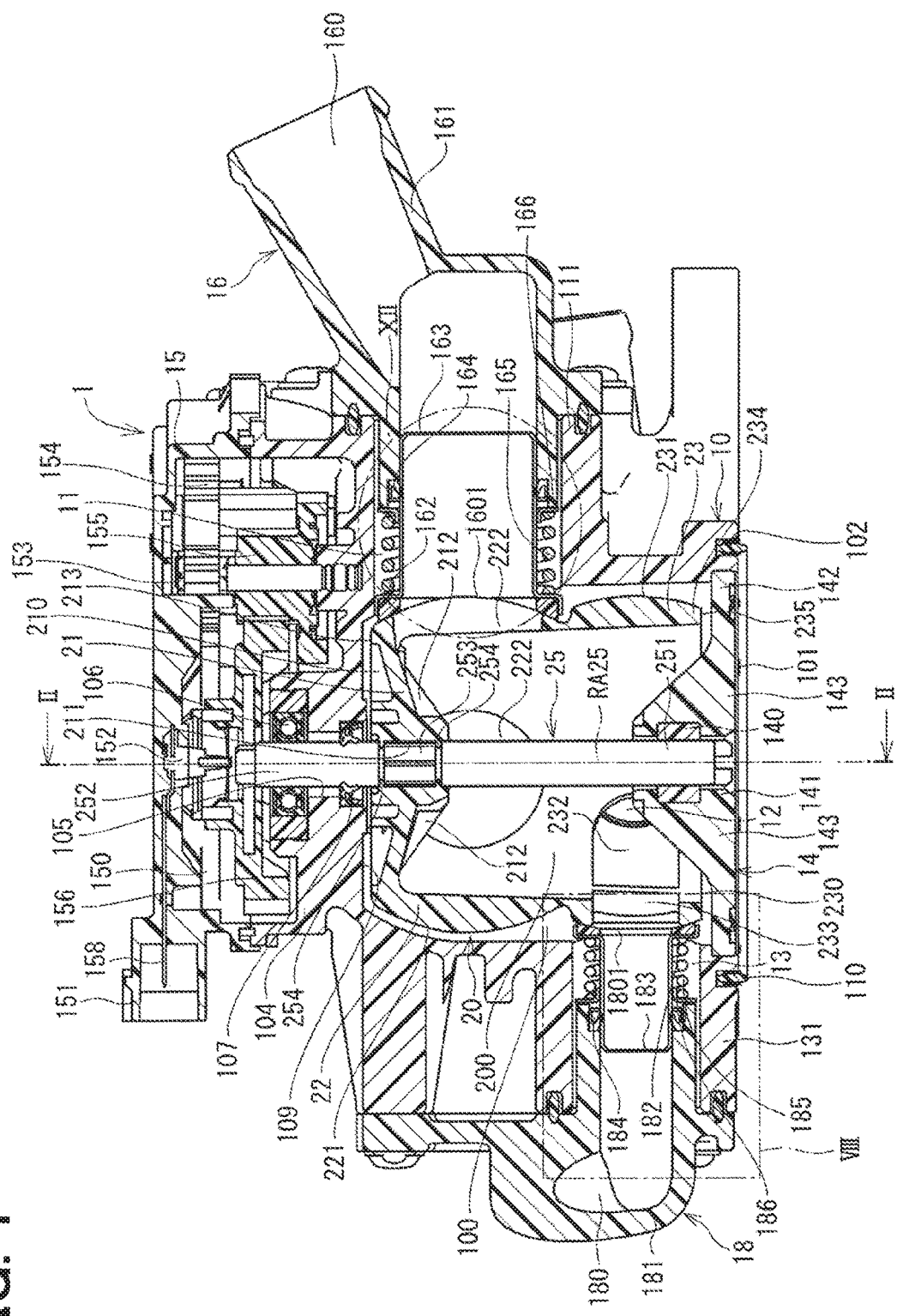
FIG. 1 is a cross-sectional view of a valve device according to a first embodiment.

Previously, there is proposed a valve device that includes a valve member and a valve housing. The valve member includes at least two openings and a communication passage while the communication passage communicates between the at least two openings. The valve housing rotatably receives the valve member and includes at least two communication holes, each of which is configured to communicate with a corresponding one of the at least two openings of the valve member. The valve device is configured to control a flow of fluid according to a rotational angle of the valve member relative to the valve housing. In one such valve device, the valve housing is shaped into a bottomed tubular form and includes a plurality of housing-side openings. The housing-side openings are formed at one end part of the valve housing in an axial direction of a rotational axis and a radially outer side part of the valve housing located on a radially outer side with respect to the rotational axis. The valve member is shaped into a bottomed tubular form and is rotatably received in the valve housing. The valve member includes a plurality of valve-member-side openings, each of which is formed at an outer wall of the valve member located on the radially outer side and is configured to communicate with a corresponding one of the plurality of housing-side openings.

In the valve device discussed above, the valve member includes a contact portion that is configured to contact a limiter formed at the valve housing. When the contact portion contacts the limiter, rotation of the valve member is limited. However, in the valve device discussed above, the contact portion projects from the valve member in the axial direction of the valve member, so that a size of the valve device, which is measured in the axial direction, is disadvantageously increased.

According to the present disclosure, there is provided a valve device that includes a valve housing, a valve member, a limiter, a contact portion and a shaft.

The valve housing has an inside space and a plurality of housing-side openings. The plurality of housing-side openings communicates between the inside space and an outside of the valve housing.

The valve member is rotatably received in the valve housing. The valve member has: a plurality of valve-member-side openings, each of which is configured to communicate with a corresponding one of the plurality of housing-side openings; and a communication passage, through which the plurality of valve-member-side openings is communicated with each other.

The limiter is configured to limit rotation of the valve member.

The contact portion is provided in a space of the valve member and is configured to contact the limiter.

The shaft rotatably supports the valve member.

In the valve device of the present disclosure, the contact portion, against which the limiter for limiting the rotation of the valve member contacts, is provided in the space of the valve member. In this way, the contact portion does not project form the valve member, so that a size of the valve member can be reduced in comparison to a case where the contact portion projects from the valve member. Therefore, the rotational angle of the valve member can be limited within a desirable angular range while implementing a compact size of the valve member.

Hereinafter, various embodiments will be described with reference to the accompanying drawings. In the following embodiments, substantially identical portions will be indicated by the same reference sings and will not be redundantly described.

First Embodiment

A fluid control valve 1 (serving as a valve device) according to a first embodiment is applied to a cooling system for cooling an engine.

Figure 3:
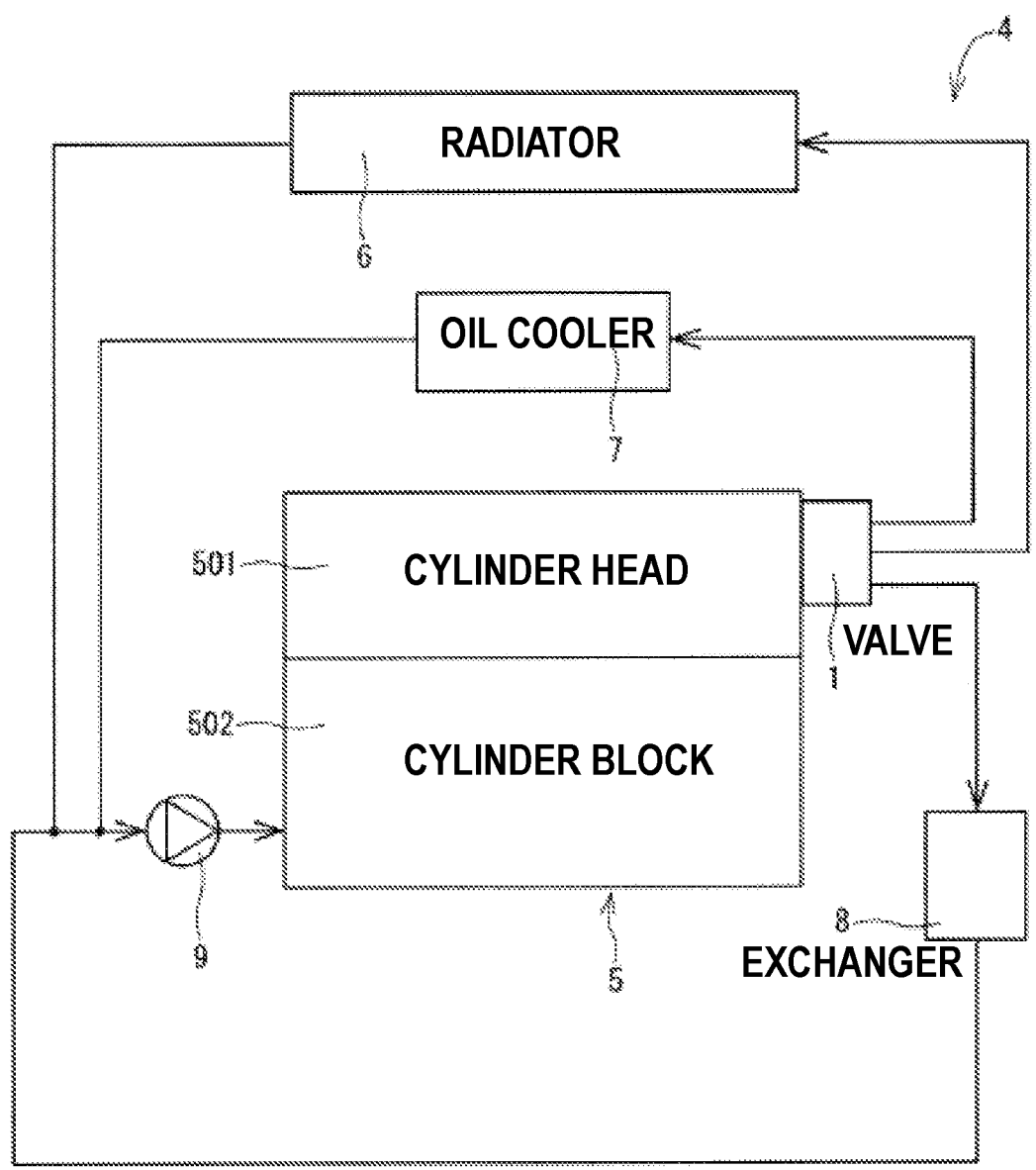
FIG. 3 is a schematic diagram of a cooling system, in which the valve device of the first embodiment is applied.

First of all, a cooling system 4, in which the fluid control valve 1 is applied, will be described with reference to FIG. 3. The fluid control valve 1 is installed to a cylinder head 501 of an engine 5. Coolant, which flows in a cylinder block 502 and the cylinder head 501 of the engine 5, is fed to the fluid control valve 1. The coolant, which is fed to the fluid control valve 1, is supplied to a radiator 6, an oil cooler 7 and an air conditioning heat exchanger 8. The coolant, which is supplied to the radiator 6, the oil cooler 7 and the air conditioning heat exchanger 8, is returned to a water pump 9 and is pressurized by the water pump 9, and this pressurized coolant is used once again for cooling the engine 5.

The fluid control valve 1 includes a first housing 10 (serving as a valve housing), a bearing 14, a second housing 15 (serving as a valve housing), a radiator pipe line 16 (serving as a valve housing), an oil cooler pipe line 17 (serving as a valve housing), an air conditioning pipe line 18 (serving as a valve housing), a valve member 20, a contact portion 24, a limiter 19 and a shaft 25.

The first housing 10 is a member that is substantially shaped into a bottomed tubular form and is made of resin. The first housing 10 includes a valve member receiving space 100 (serving as a housing inside space), which is substantially shaped into a columnar form and is configured to receive the valve member 20.

The first housing 10 includes an insertion hole 101 (serving as one housing-side opening) that is communicated with the valve member receiving space 100. An inner diameter of the insertion hole 101 is set to enable insertion of the valve member 20 into the valve member receiving space 100 through the insertion hole 101. Furthermore, the insertion hole 101 functions as a flow inlet, through which the coolant is fed from the engine 5 into the valve member receiving space 100. A groove 102, which is configured to receive an O-ring 110, is formed at a peripheral part of the first housing 10, which forms the insertion hole 101, while the O-ring 110 is configured to maintain liquid tightness between the fluid control valve 1 and the cylinder head 501 at the time of assembling the fluid control valve 1 to the cylinder head 501.

The first housing 10 includes three insertion holes 11, 12, 13 placed on a radially outer side of the valve member receiving space 100.

Among the three insertion holes 11, 12, 13, the insertion hole 11 is formed at a closest location that is closest to a housing bottom 104 located on an opposite side of the valve member receiving space 100, which is opposite from the insertion hole 101. The insertion hole 11 is configured to receive the radiator pipe line 16.

The insertion holes 12, 13 are placed between the insertion hole 11 and the insertion hole 101. The insertion hole 12 and the insertion hole 13 are respectively placed at locations that are circumferentially displaced from each other by generally 90 degrees about a rotational axis RA25 of the shaft 25 (see and compare FIG. 1 and FIG. 2). The insertion hole 12 is configured to receive the oil cooler pipe line 17. The insertion hole 13 is configured to receive the air conditioning pipe line 18.

A through hole 105 is formed at a substantially center part of the housing bottom 104. The other end part 252 of the shaft 25 is inserted through the through hole 105. A bearing portion 106 is provided at an inner wall of the through hole 105. The bearing portion 106 rotatably supports the other end part 252 of the shaft 25.

A seal member 107 is installed between the bearing portion 106 and the valve member receiving space 100 along the inner wall of the through hole 105 while the seal member 107 is configured to maintain liquid tightness between a portion of the through hole 105, which is located on the bearing portion 106 side of the seal member 107, and the valve member receiving space 100.

Figure 2:
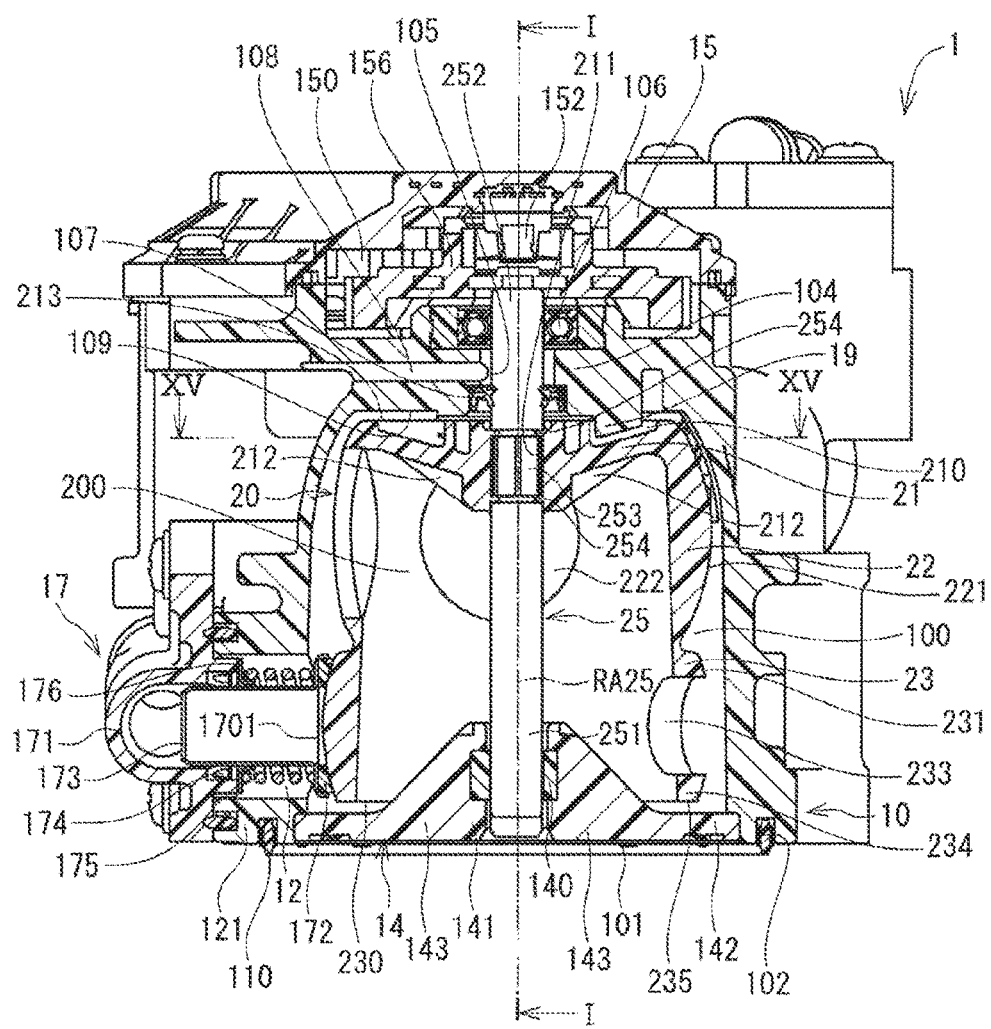
FIG. 2 is a cross-sectional view taken along line II-II in FIG. 1.

The housing bottom 104 includes a drain passage 108, which is located between the bearing portion 106 and the seal member 107 and is communicated with the through hole 105 (see FIG. 2). The drain passage 108 communicates between the through hole 105 and an outside of the fluid control valve 1. The drain passage 108 is configured to drain the coolant, which penetrates through the seal member 107 and thereby intrudes into the portion of the through hole 105 located on the bearing portion 106 side of the seal member 107.

The bearing 14 is provided to the insertion hole 101. The bearing 14 includes a center portion 141, a ring portion 142, a plurality of connecting portions 143 and a bearing portion 140.

The center portion 141 is located on a radially outer side of one end part 251 of the shaft 25. The center portion 141 is substantially shaped into a tubular form and extends along the rotational axis RA25 of the shaft 25. The bearing portion 140 is installed at an end part of the center portion 141, which is located on the space 200 side at the time of assembling the bearing 14 to the first housing 10, and the bearing portion 140 rotatably supports the one end part 251 of the shaft 25.

The ring portion 142 is substantially shaped into a ring form and is placed on the radially outer side of the center portion 141, and the ring portion 142 is installed to a portion of the first housing 10, which forms the insertion hole 101. In the fluid control valve 1, the ring portion 142 is placed on the radially outer side of the other end part of the center portion 141, which is located on the opposite side that is opposite from the space 200 at the time of assembling the bearing 14 to the first housing 10. Specifically, as shown in FIGS. 1 and 2, the ring portion 142 and the bearing portion 140 are offset from each other along the rotational axis RA25.

Figure 4:
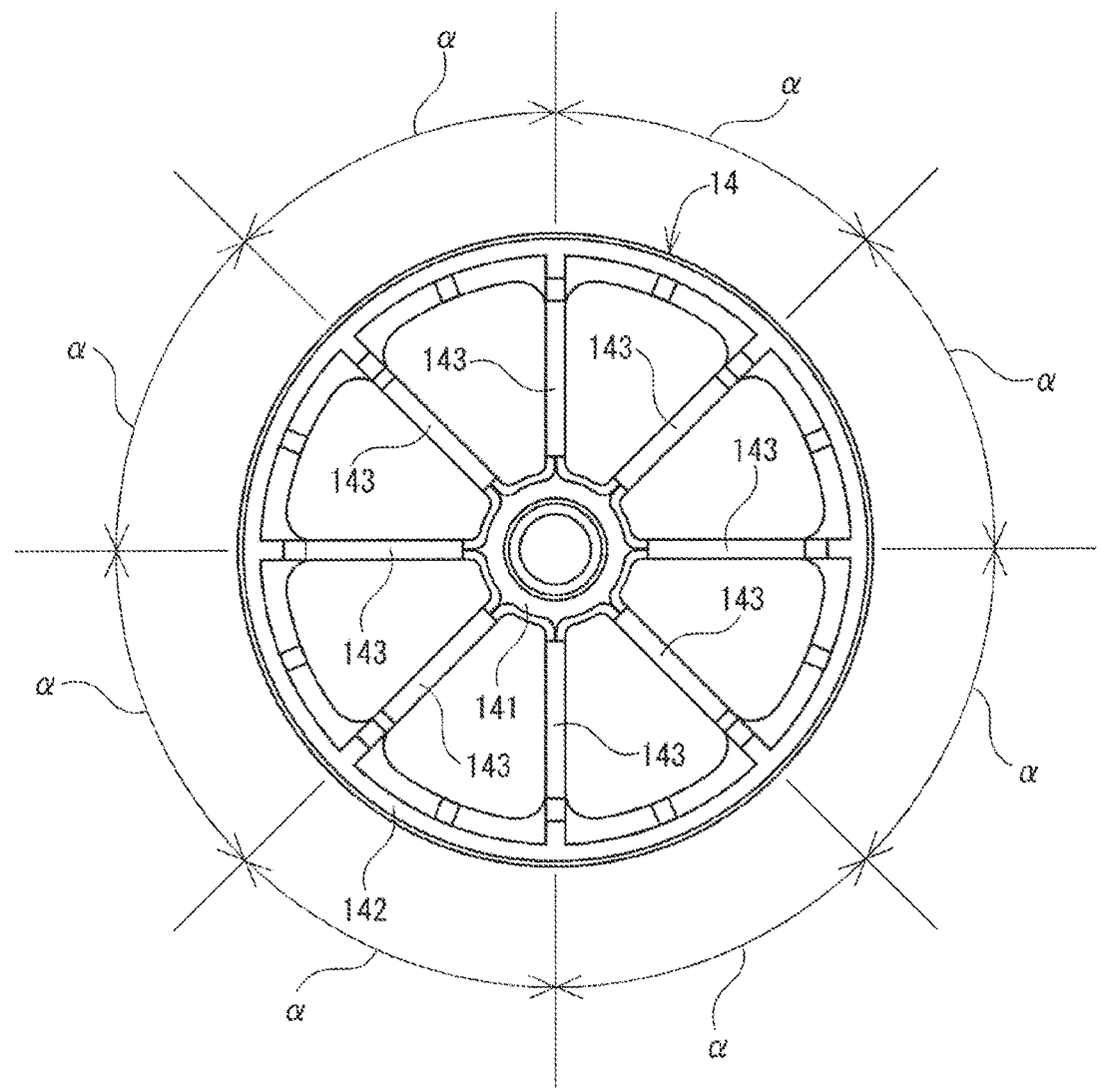
FIG. 4 is a schematic diagram of a bearing of the valve device according to the first embodiment.
Figure 5:
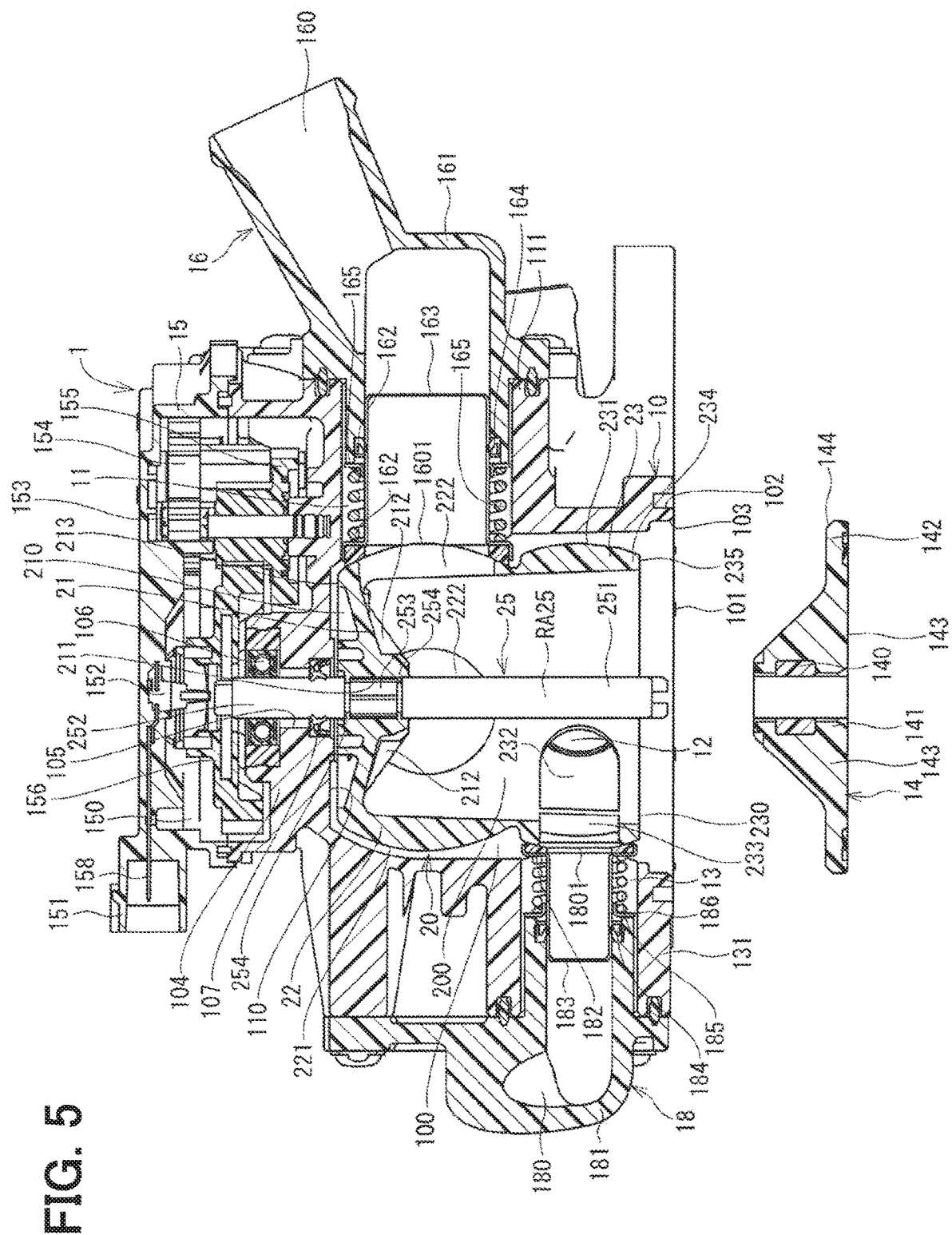
FIG. 5 is a cross-sectional view showing a state where the valve device of the first embodiment is exploded.

The connecting portions 143 connect between the center portion 141 and the ring portion 142. The connecting portions 143 are arranged one after the other around the center portion 141 and radially outwardly extend from the center portion 141 to the ring portion 142. As shown in FIGS. 1, 2 and 5, the connecting portions 143 are respectively formed such that an axial length of an end part of the connecting portion 143, which is joined to the center portion 141, is substantially the same as an axial length of the center portion 141 in the axial direction of the rotational axis RA25, and the axial length of the connecting portion 143 in the axial direction of the rotational axis RA25 is progressively reduced in a direction away from the rotational axis RA25. When the bearing 14 is viewed in the axial direction of the rotational axis RA25 of the shaft 25, an interval between each adjacent two of the connecting portions 143 is set to an identical angle $\alpha$, as shown in FIG. 4. A gap, through which the coolant can flow, is formed between each adjacent two of the connecting portions 143.

In the fluid control valve 1, as shown in FIG. 5, an end part of the ring portion 142, which is located on the side inserted into the insertion hole 101, includes a tilt surface 144 that is tilted relative to the rotational axis RA25 of the shaft 25. As shown in FIG. 5, the tilt surface 144 is tilted such that the tilt surface 144 is progressively spaced away from the rotational axis RA25 in a direction, which is substantially parallel to the rotational axis RA25 and is away from the space 200 toward the outside.

An end part of the first housing 10, which contacts the tilt surface 144 at the time of assembling the bearing 14 to the first housing 10, has a contact surface 103. As shown in FIG. 5, the contact surface 103 is formed such that the contact surface 103 is progressively spaced away from the rotational axis RA25 in the direction, which is substantially parallel to the rotational axis RA25 and is away from the space 200 toward the outside.

Figure 6:
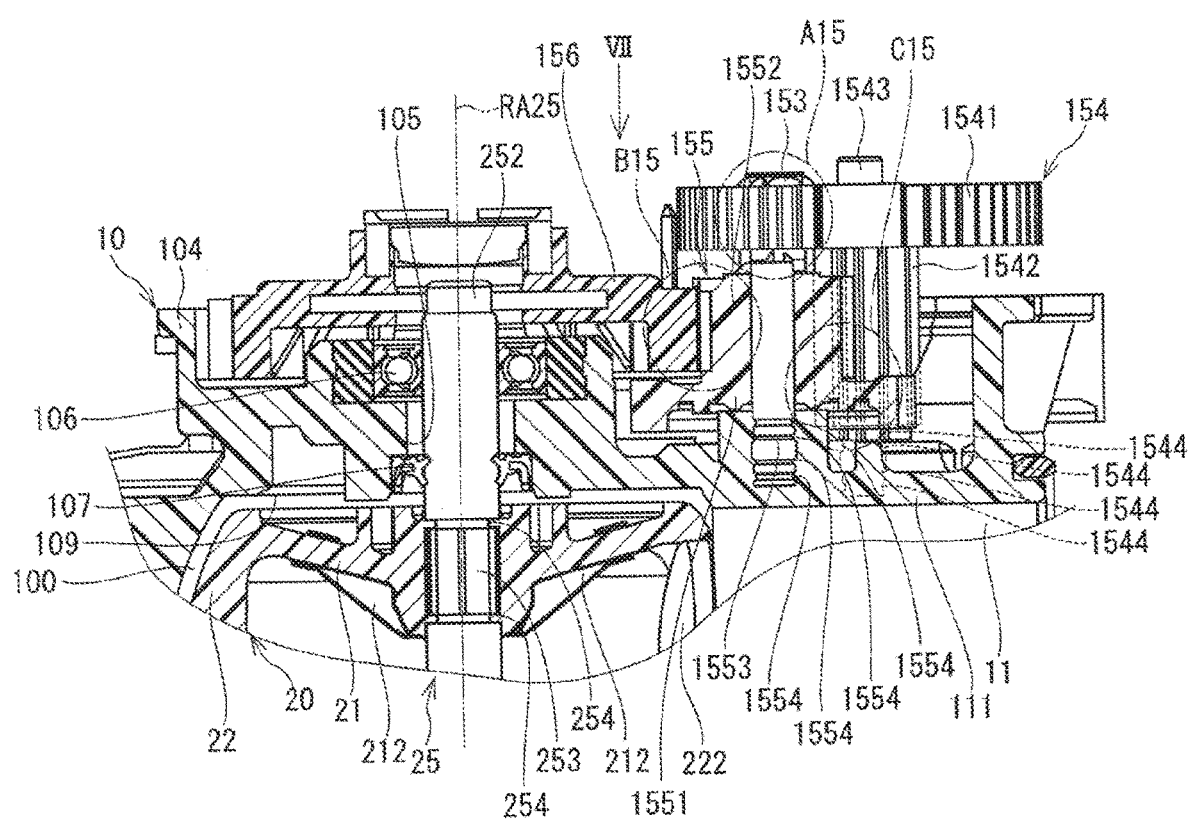
FIG. 6 is a partial cross-sectional view of the valve device according to the first embodiment.

The second housing 15 is placed on an opposite side of the first housing 10 that is opposite from the side of the first housing 10 where the insertion hole 101 is formed. The second housing 15 includes a connector 151. Furthermore, the second housing 15 forms a receiving chamber 150 between the first housing 10 and the second housing 15, and the receiving chamber 150 receives a rotational angle sensor 152, a motor gear 153, a first intermediate gear 154, a second intermediate gear 155 and a valve gear 156. FIG. 6 is a cross-sectional view showing a region around the receiving chamber 150 in a state where the second housing 15 is removed.

The rotational angle sensor 152 is placed adjacent to the other end part 252 of the shaft 25. The rotational angle sensor 152 is configured to output a signal that corresponds to a rotational angle of the shaft 25.

Figure 7:
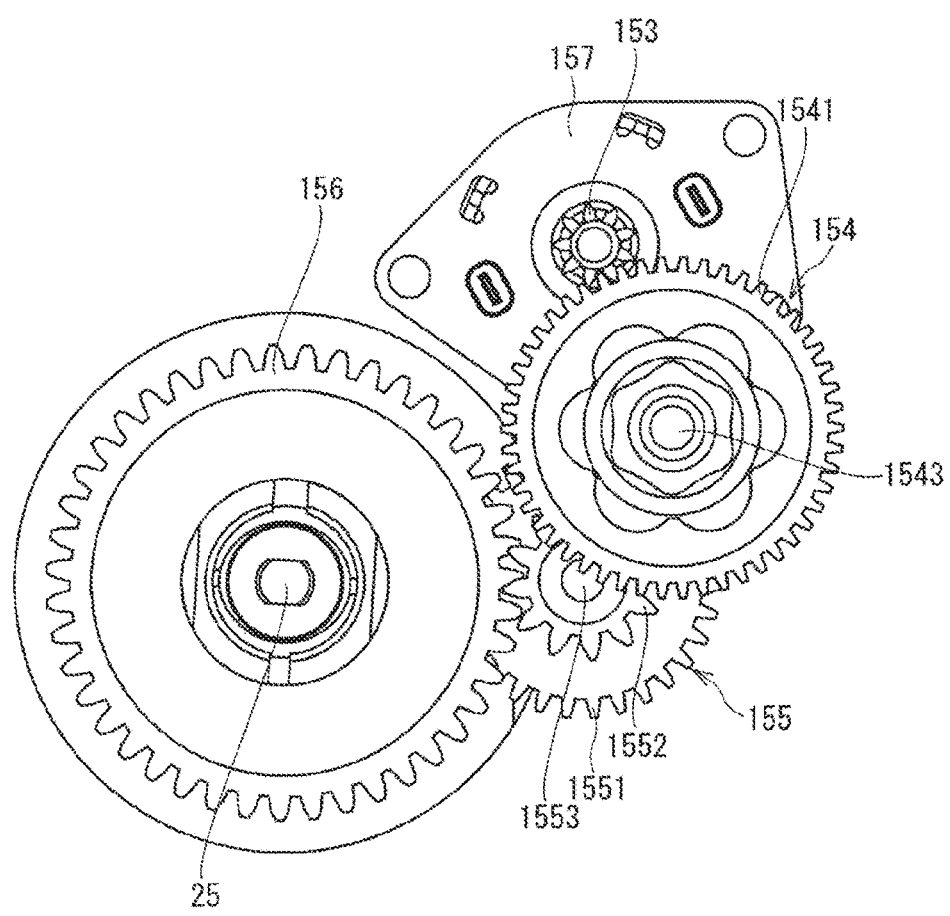
FIG. 7 is a schematic view showing a meshed state of a motor gear, a first intermediate gear, a second intermediate gear and a valve gear of the valve device according to the first embodiment.

The motor gear 153 is installed to an electric motor 157 of the fluid control valve 1 (see FIG. 7). The motor gear 153 is rotated by a drive force outputted from the motor 157.

The first intermediate gear 154 couples between the motor gear 153 and the second intermediate gear 155. The first intermediate gear 154 includes a first large gear 1541, a first small gear 1542 and a first gear shaft 1543. The first large gear 1541 is meshed with the motor gear 153. As shown in FIG. 6, the first small gear 1542 is placed on the first housing 10 side of the first large gear 1541 and is meshed with the second intermediate gear 155. The first gear shaft 1543 connects between the first large gear 1541 and the first small gear 1542 to enable integral rotation of the first large gear 1541 and the first small gear 1542. As shown in FIG. 6, a plurality of grooves 1544 is formed at an outer peripheral part of a portion of the first gear shaft 1543, which is inserted into the second housing 15.

The second intermediate gear 155 couples between the first intermediate gear 154 and the valve gear 156. The second intermediate gear 155 includes a second large gear 1551, a second small gear 1552 and a second gear shaft 1553. The second large gear 1551 is meshed with the first small gear 1542. As shown in FIG. 6, the second small gear 1552 is placed on an opposite side of the second large gear 1551, which is opposite from the first housing 10, and the second small gear 1552 is meshed with the valve gear 156. The second gear shaft 1553 connects between the second large gear 1551 and the second small gear 1552 to enable integral rotation of the second large gear 1551 and the second small gear 1552. As shown in FIG. 6, a plurality of grooves 1554 is formed at an outer peripheral part of a portion of the second gear shaft 1553, which is inserted into the second housing 15.

The valve gear 156 couples between the second intermediate gear 155 and the shaft 25. Specifically, the valve gear 156 is fixed to the other end part 252 of the shaft 25 and is rotatable integrally with the shaft 25.

When the motor 157 outputs the drive force, the drive force is transmitted to the shaft 25 through the motor gear 153, the first intermediate gear 154, the second intermediate gear 155 and the valve gear 156. The shaft 25 and the valve member 20, which are rotatable integrally, are rotated by the transmitted drive force.

In the fluid control valve 1, the motor gear 153, the first intermediate gear 154, the second intermediate gear 155 and the valve gear 156 are arranged such that in a view taken from the first housing 10 side, a location (the location indicated by a dot-dash line C15 in FIG. 6), at which a first small gear 1542 of the first intermediate gear 154 and the second large gear 1551 of the second intermediate gear 155 are meshed with each other, a location (the location indicated by a dot-dash line B15 in FIG. 6), at which the valve gear 156 and a second small gear 1552 of the second intermediate gear 155 are meshed with each other, and a location (the location indicated by a dot-dash line A15 in FIG. 6), at which the motor gear 153 and the first large gear 1541 of the first intermediate gear 154 are meshed with each other, are arranged one after the other in this order.

Furthermore, as shown in FIG. 7, the first large gear 1541 of the first intermediate gear 154 is formed such that the first large gear 1541 overlaps with a portion of the second gear shaft 1553 of the second intermediate gear 155. Specifically, as shown in FIG. 6, when the rotational axis of the second gear shaft 1553 is extended in a direction, which is parallel to the rotational axis RA25 of the shaft 25 and is directed from the second large gear 1551 toward the second small gear 1552, the extension of the rotational axis of the second gear shaft 1553 overlaps with the first large gear 1541.

The drive force, which is outputted from the motor 157, is transmitted to the shaft 25 through the motor gear 153, the first intermediate gear 154, the second intermediate gear 155 and the valve gear 156.

The connector 151 includes terminals 158 that are electrically connected to the rotational angle sensor 152 and the motor 157. The terminals 158 are electrically connected to a controller (not shown) through an external connector (not shown). The connector 151 is configured to output the signal, which is outputted from the rotational angle sensor 152, to the controller, and the controller is also configured to receive an electric power, which is supplied to the motor, from the outside.

The shaft 25 is substantially shaped into a rod form and is made of metal, and the shaft 25 includes the one end part 251, the other end part 252 and an insert portion 253.

The one end part 251 is inserted into the bearing 14 and is rotatably supported by the bearing portion 140.

The other end part 252 is inserted into the housing bottom 104 and is rotatably supported by the bearing portion 106.

Figure 11:
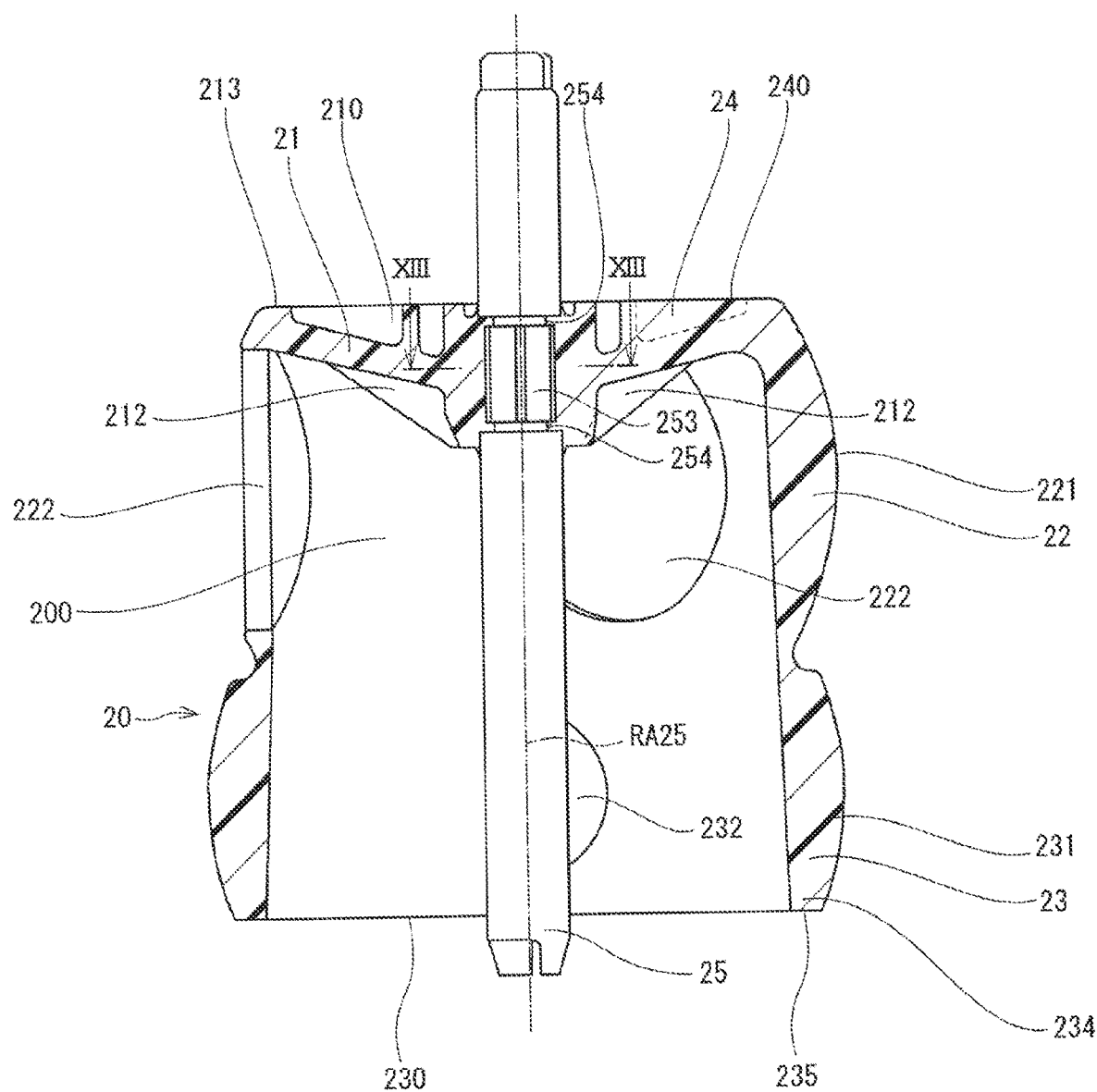
FIG. 11 is a cross-sectional view of the valve member of the valve device according to the first embodiment.
Figure 13:
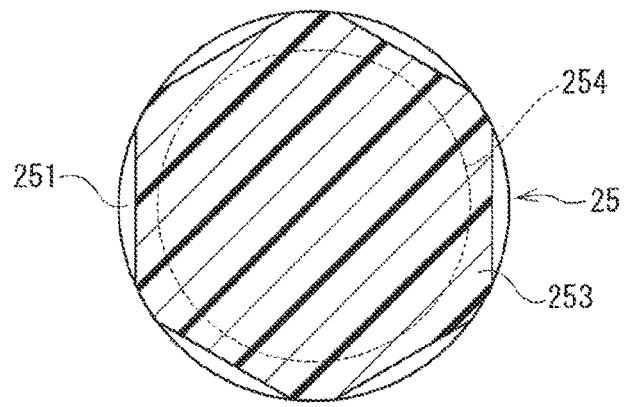
FIG. 13 is a cross-sectional view taken along line XIII-XIII in FIG. 11.

The insert portion 253 is placed between the one end part 251 and the other end part 252 and is inserted into the valve member 20, as shown in FIGS. 1, 2 and 11. The insert portion 253 is formed such that the cross section of the insert portion 253, which is substantially perpendicular to the rotational axis RA25, is shaped into a polygonal form, as shown in FIG. 13. Two grooves 254, 255, each of which has an outer diameter smaller than an outer diameter of the insert portion 253, are respectively formed on the one end part 251 side of the insert portion 253 and the other end part 252 side of the insert portion 253.

The radiator pipe line 16 includes a radiator pipe 161, a seat 162, a sleeve 163, a packing 164, a spring 165 and a plate 166.

The radiator pipe 161 is substantially shaped into a tubular form. The radiator pipe 161 is fixed to an opening portion 111 of the first housing 10. The radiator pipe 161 forms a radiator passage 160.

The seat 162 is a member, which is substantially shaped into a ring form and is made of, for example, PTFE separately from the radiator pipe 161. The seat 162 includes one opening 1601 (serving as a remaining housing-side opening). The seat 162 is configured to contact an outer wall of the valve member 20.

The sleeve 163 is a member, which is substantially shaped into a tubular form and is placed between the radiator pipe 161 and the seat 162. One end part of the sleeve 163, which is located on the radiator pipe 161 side, is inserted into the radiator passage 160. An opposite end part of the sleeve 163, which is opposite from the one end part of the sleeve 163 inserted into the radiator passage 160, is shaped to have an enlarged inner diameter larger than that of the other part of the sleeve 163 and supports the seat 162.

The packing 164 is placed on the radially outer side of the portion of the sleeve 163, which is inserted into the radiator passage 160. The packing 164 maintains liquid tightness between the radiator passage 160 and the insertion hole 11.

The spring 165 is placed between a valve member 20 side end surface of the radiator pipe 161 and a radiator pipe 161 side end surface of the portion of the sleeve 163, which supports the seat 162. The spring 165 urges the seat 162 in a direction, along which the radiator pipe 161 and the seat 162 are urged away from each other by the spring 165. In this way, the seat 162 is urged against the outer wall of the valve member 20 and maintains liquid tightness between the insertion hole 11 and the inside of the valve member 20 and of the sleeve 163.

The plate 166 is placed on a radially inner side of the spring 165. A cross section of the plate 166 is shaped into an L-shape, and the plate 166 contacts both of a valve member 20 side end surface of the radiator pipe 161 and an outer peripheral wall surface of the sleeve 163, which are perpendicular to each other.

The oil cooler pipe line 17 includes an oil cooler pipe 171, a seat 172, a sleeve 173, a packing 174, a spring 175 and a plate 176.

The oil cooler pipe 171 is substantially shaped into a tubular form. The oil cooler pipe 171 is fixed to an opening portion 121 of the first housing 10. The oil cooler pipe 171 forms an oil cooler passage 170.

The seat 172 is a member, which is substantially shaped into a ring form and is made of, for example, PTFE separately from the oil cooler pipe 171. The seat 172 includes one opening 1701 (serving as a remaining housing-side opening). The seat 172 is configured to contact an outer wall of the valve member 20.

The sleeve 173 is a member, which is substantially shaped into a tubular form and is placed between the oil cooler pipe 171 and the seat 172. One end part of the sleeve 173, which is located on the oil cooler pipe 171 side, is inserted into the oil cooler passage 170. An opposite end part of the sleeve 173, which is opposite from the one end part of the sleeve 173 inserted into the oil cooler passage 170, is shaped to have an enlarged inner diameter larger than that of the other part of the sleeve 173 and supports the seat 172.

The packing 174 is placed on the radially outer side of the portion of the sleeve 173, which is inserted into the oil cooler passage 170. The packing 174 maintains liquid tightness between the oil cooler passage 170 and the insertion hole 12.

The spring 175 is placed between a valve member 20 side end surface of the oil cooler pipe 171 and an oil cooler pipe 171 side end surface of the portion of the sleeve 173, which supports the seat 172. The spring 175 urges the seat 172 in a direction, along which the oil cooler pipe 171 and the seat 172 are urged away from each other by the spring 175. In this way, the seat 172 is urged against the outer wall of the valve member 20 and maintains liquid tightness between the insertion hole 12 and the inside of the valve member 20 and of the sleeve 173.

The plate 176 is placed on a radially inner side of the spring 175. A cross section of the plate 176 is shaped into an L-shape, and the plate 176 contacts both of a valve member 20 side end surface of the oil cooler pipe 171 and an outer peripheral wall surface of the sleeve 173, which are perpendicular to each other.

The air conditioning pipe line 18 includes an air conditioning pipe 181, a seat 182, a sleeve 183, a packing 184, a spring 185 and a plate 186.

The air conditioning pipe 181 is substantially shaped into a tubular form. The air conditioning pipe 181 is fixed to an opening portion 131 of the first housing 10. The air conditioning pipe 181 forms an air conditioning passage 180.

The seat 182 is a member, which is substantially shaped into a ring form and is made of, for example, PTFE separately from the air conditioning pipe 181. The seat 182 includes one opening 1801 (serving as a remaining housing-side opening). The seat 182 is configured to contact an outer wall of the valve member 20.

The sleeve 183 is a member, which is substantially shaped into a tubular form and is placed between the air conditioning pipe 181 and the seat 182. One end part 1831 of the sleeve 183, which is located on the air conditioning pipe 181 side, is inserted into the air conditioning passage 180. An opposite end part 1832 of the sleeve 183, which is opposite from the one end part 1831 of the sleeve 183, is shaped to have an enlarged inner diameter larger than that of the other part of the sleeve 183 and supports the seat 182.

The packing 184 is placed on the radially outer side of the portion of the sleeve 183, which is inserted into the air conditioning passage 180. The packing 184 maintains liquid tightness between the air conditioning passage 180 and the insertion hole 13.

The spring 185 is placed between a valve member 20 side end surface 1811 of the air conditioning pipe 181 and an air conditioning pipe 181 side end surface 1833 of the end part 1832 of the sleeve 183. The spring 185 urges the seat 182 in a direction, along which the air conditioning pipe 181 and the seat 182 are urged away from each other by the spring 185. In this way, the seat 182 is urged against the outer wall of the valve member 20 and maintains liquid tightness between the insertion hole 13 and the inside of the valve member 20 and of the sleeve 183.

Figure 8:
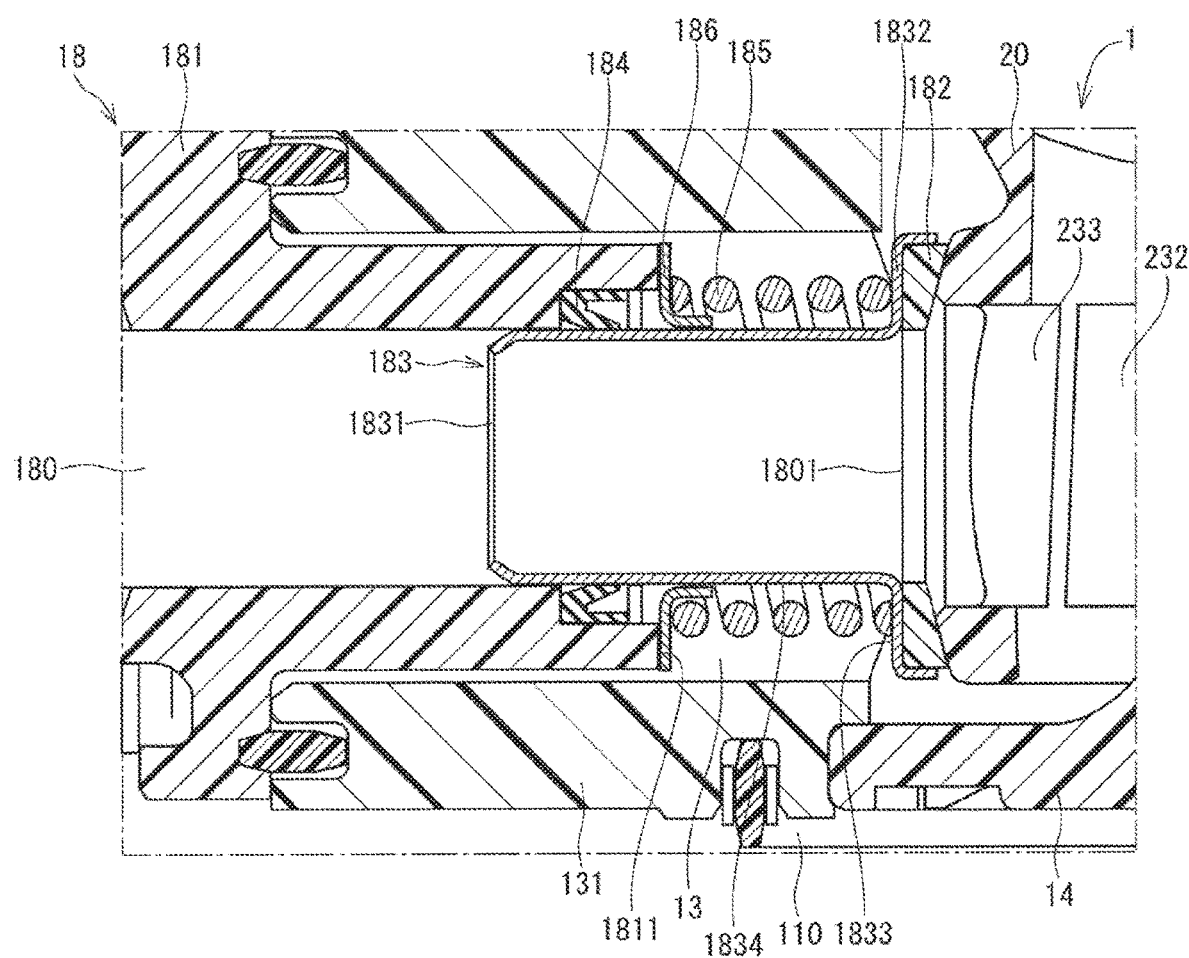
FIG. 8 is a view of a section VIII in FIG. 1.

The plate 186 is placed on a radially inner side of the spring 185. As shown in FIG. 8, a cross section of the plate 186 is shaped into an L-shape. The plate 186 contacts both of an end surface 1811 of the air conditioning pipe 181 and an outer peripheral wall surface 1834 of the sleeve 183, which are perpendicular to each other.

In order to minimize the drawings, the structure of the air conditioning pipe line 18 has been mainly described in detail, but it should be noted that the radiator pipe line 16 and the oil cooler pipe line 17 also respectively have the similar structure that is similar to the structure of the air conditioning pipe line 18.

The valve member 20 is substantially shaped into a bottomed tubular form and is made of resin, and the valve member 20 is received in the valve member receiving space 100. The rotational axis RA25 of the shaft 25 is placed along the central axis of the valve member 20. The valve member 20 includes a valve member bottom 21, a first tubular portion 22 (serving as an outer peripheral wall of the valve member) and a second tubular portion 23 (serving as an outer peripheral wall of the valve member). The valve member 20 includes a space 200 (serving as a communication passage) that is formed in an inside of the valve member 20 by the valve member bottom 21, the first tubular portion 22 and the second tubular portion 23.

Figure 10:
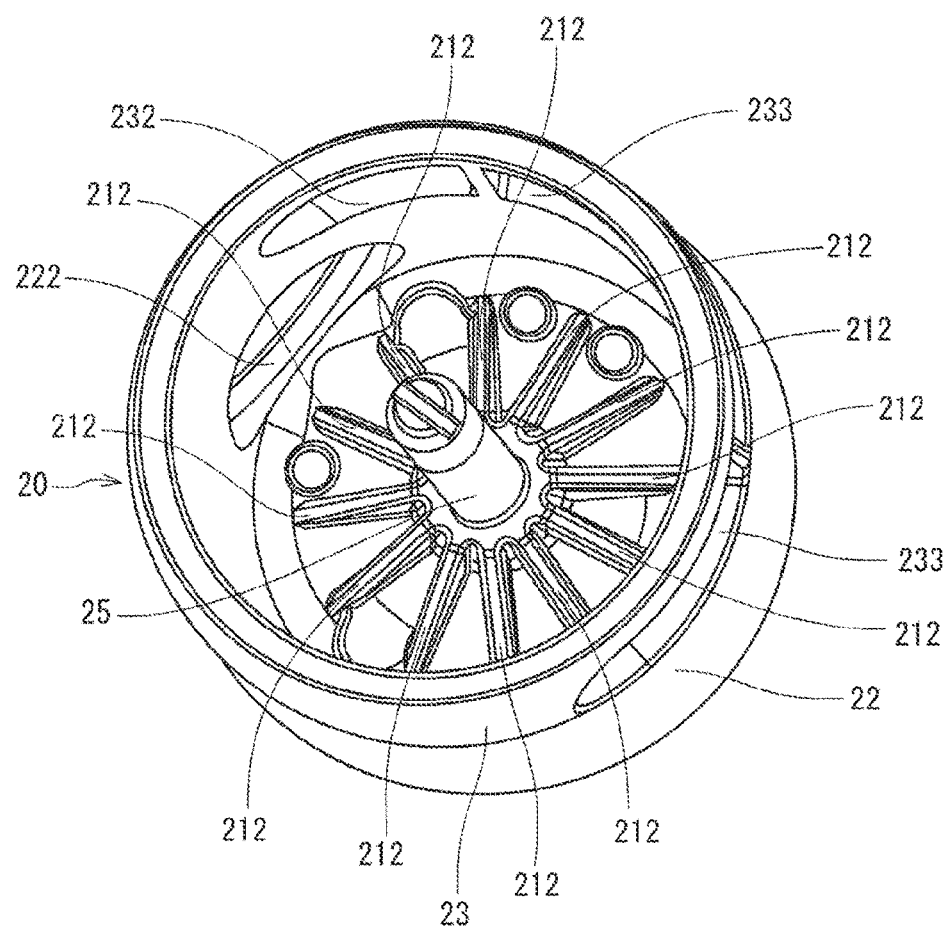
FIG. 10 is another perspective view of the valve member of the valve device according to the first embodiment.

The valve member bottom 21 is placed at a corresponding location of the valve member receiving space 100, at which the valve member bottom 21 is opposed to the housing bottom 104, and the valve member bottom 21 includes a through hole 211 that is formed at a substantially center part of the valve member bottom 21 and is configured to receive the shaft 25. Once the shaft 25 is inserted into the through hole 211, relative movement between the valve member 20 and the shaft 25 is disabled, and thereby the valve member 20 and the shaft 25 are integrally rotatable. As shown in FIG. 10, the valve member bottom 21 includes a plurality of ribs 212 that are formed at a surface of the valve member bottom 21 located on a side where the space 200 is placed. In a view taken from the rotational axis RA25, the ribs 212 are radiated to extend radially outward.

An opposing side of the valve member bottom 21, which is opposed to the housing bottom 104, is formed as following. Specifically, the opposing side of the valve member bottom 21 is progressively spaced away from the housing bottom 104 in a radially inward direction from an outer peripheral part of the valve member bottom 21, at which the first tubular portion 22 is placed, toward the through hole 211. Thereby, as shown in FIG. 11, the valve member bottom 21 has a recess 210 (serving as a space of the valve member), which is recessed in the axial direction of the rotational axis RA25.

The first tubular portion 22 extends from the valve member bottom 21 in an opposite direction that is opposite from the housing bottom 104. The second tubular portion 23 is placed at an opposite end part of the first tubular portion 22, which is opposite from a side of the first tubular portion 22 that is connected to the valve member bottom 21. As shown in FIGS. 1, 2 and 11, a cross section of an outer wall surface 221 of the first tubular portion 22, which includes the rotational axis RA25, is configured such that a center part of the cross section of the outer wall surface 221 is radially outwardly bulged relative to an end part of the cross section of the outer wall surface 221, which is joined to the valve member bottom 21, and another end part of the cross section of the outer wall surface 221, which is joined to the second tubular portion 23.

The first tubular portion 22 includes a plurality of valve-member-side openings 222 (serving as remaining valve-member-side openings) that communicate between the space 200 and the outside of the first tubular portion 22. In the first embodiment, the number of the valve-member-side openings 222 of the first tubular portion 22 is two. Each of the valve-member-side openings 222 is configured to communicate with the radiator passage 160 according to a rotational angle of the valve member 20. Specifically, the seat 162 of the radiator pipe line 16 is urged against the outer wall surface 221 that forms the valve-member-side openings 222.

The second tubular portion 23 extends from the end part of the first tubular portion 22, which is opposite from the end part of the first tubular portion 22 joined to the valve member bottom 21, in an opposite direction that is opposite from the housing bottom 104. The second tubular portion 23 has a flow inlet 230 (serving as one valve-member-side opening) at an opposite side of the second tubular portion 23 that is opposite from the first tubular portion 22 in the axial direction of the rotational axis RA25. The coolant, which flows from the engine 5, enters the space 200 through the flow inlet 230. As shown in FIGS. 1, 2 and 11, a cross section of an outer wall surface 231 of the second tubular portion 23, which includes the rotational axis RA25, is configured such that a center part of the cross section of the outer wall surface 231 is radially outwardly bulged relative to an end part of the cross section of the outer wall surface 231, which is joined to the first tubular portion 22, and another end part of the cross section of the outer wall surface 231, which forms the flow inlet 230.

The second tubular portion 23 includes two valve-member-side openings 232, 233 (serving as remaining valve-member-side openings) that communicate between the space 200 and the outside of the second tubular portion 23.

The valve-member-side opening 232 is configured to communicate with the oil cooler passage 170 according to a rotational angle of the valve member 20. Specifically, the seat 172 of the oil cooler pipe line 17 is urged against a corresponding portion of the outer wall surface 231 that forms the valve-member-side opening 232.

The valve-member-side opening 233 is configured to communicate with the air conditioning passage 180 in response to the rotation of the valve member 20. Specifically, the seat 182 of the air conditioning pipe line 18 is urged against a corresponding portion of the outer wall surface 231 that forms the valve-member-side opening 233.

Figure 12:
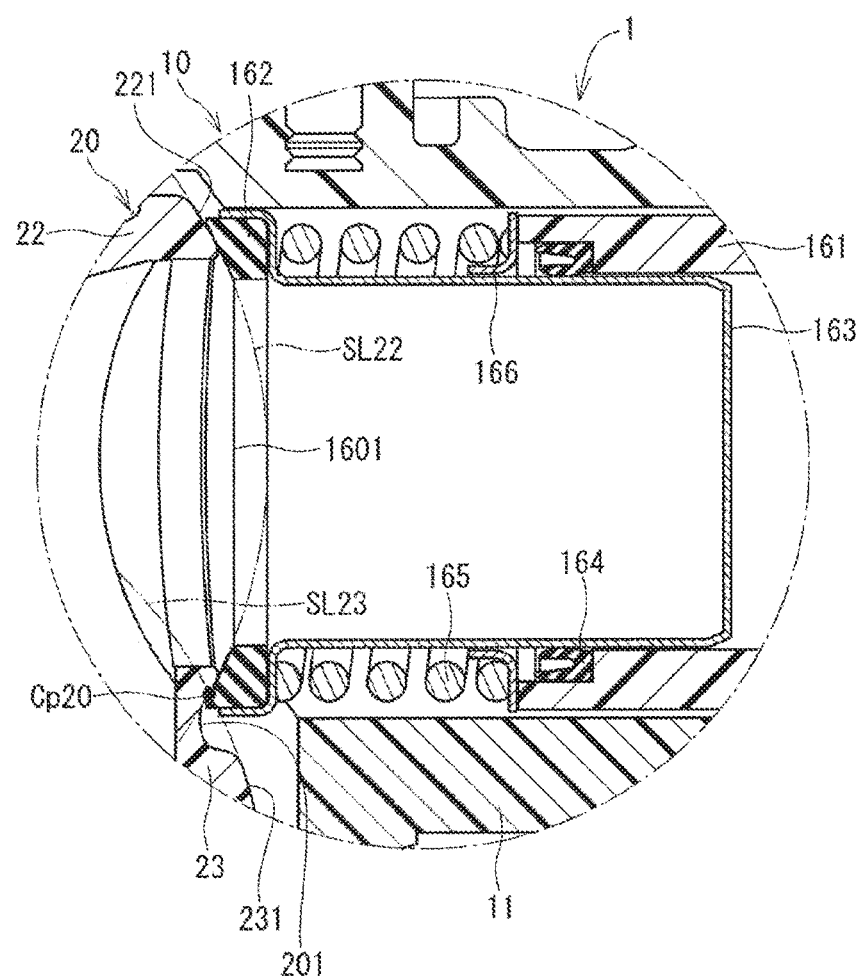
FIG. 12 is a view of a section XII in FIG. 1.

FIG. 12 shows a cross-sectional view of a portion of the fluid control valve 1, at which the radiator pipe line 16 and valve member 20 contact with each other, along an imaginary plane that includes the rotational axis RA25 of the valve member 20.

As shown in FIG. 12, in the fluid control valve 1, an intersection point Cp20, at which an imaginary outline SL22 along the outer wall surface 221 of the first tubular portion 22 and an imaginary outline SL23 along the outer wall surface 231 of the second tubular portion 23 intersect with each other, is located at a contact surface, at which the seat 162 and the valve member 20 contact with each other. In the fluid control valve 1, the valve member 20 has a recess 201 that is formed at the second tubular portion 23 and is located between the first tubular portion 22 and the second tubular portion 23.

Figure 9:
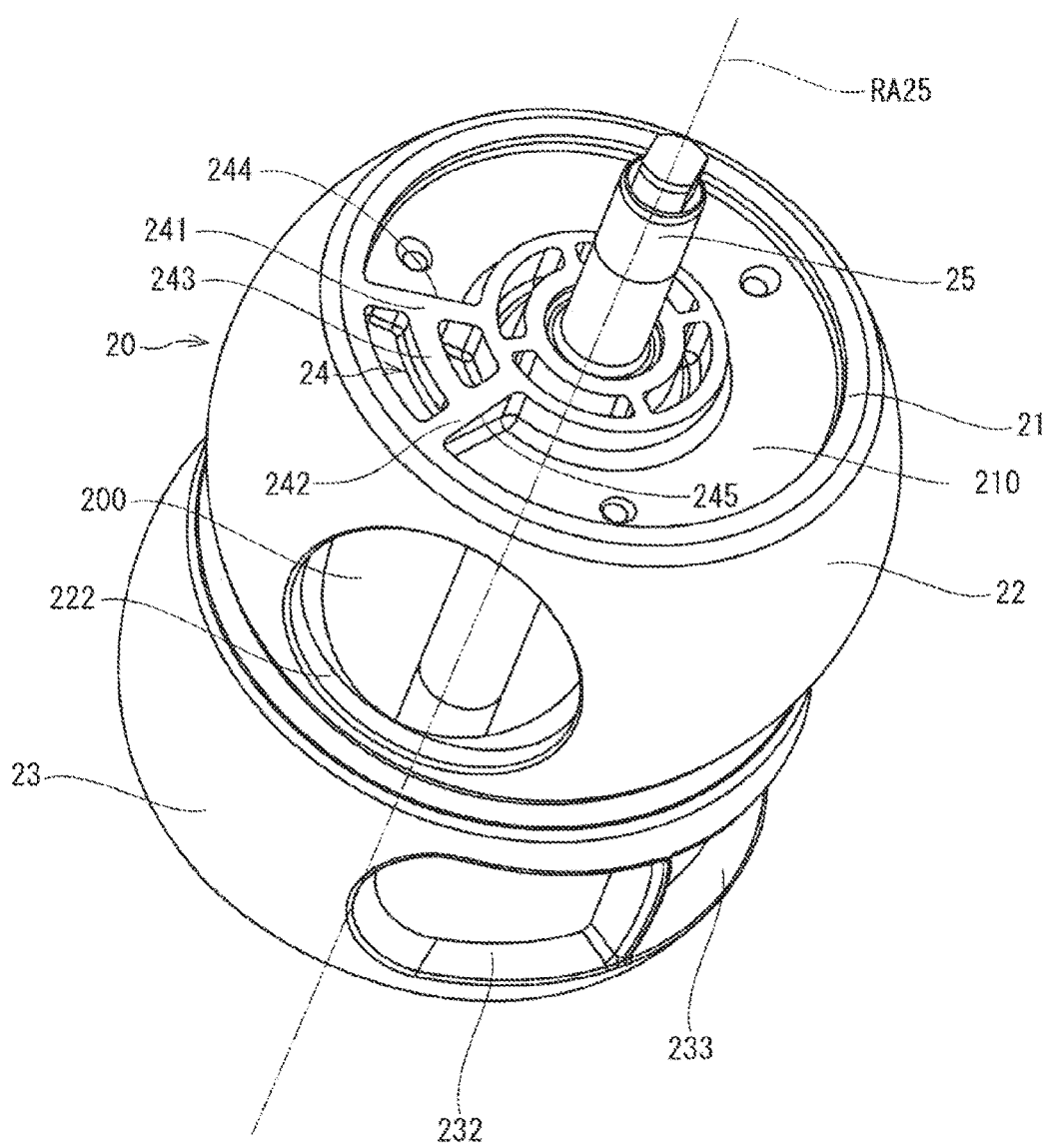
FIG. 9 is a perspective view of a valve member of the valve device according to the first embodiment.

The contact portion 24 is formed at the recess 210 of the valve member bottom 21. In the first embodiment, the contact portion 24 is formed integrally with the valve member 20 in one piece. As shown in FIG. 11, an axial location of an end surface 240 of the contact portion 24, which is opposed to the housing bottom 104, is the same as an axial location of an end surface 213 of the valve member bottom 21, which is opposed to the housing bottom 104, in the axial direction of the rotational axis RA25. As shown in FIG. 9, the contact portion 24 includes two side walls 241, 242 and a rib 243.

The side walls 241, 242 radially extend along two different radial directions in a view taken from the rotational axis RA25.

The rib 243 extends between the side wall 241 and the side wall 242. The rib 243 supports the side walls 241, 242.

The contact portion 24 is configured to contact the limiter 19 that is formed at the housing bottom 104.

Figure 14:
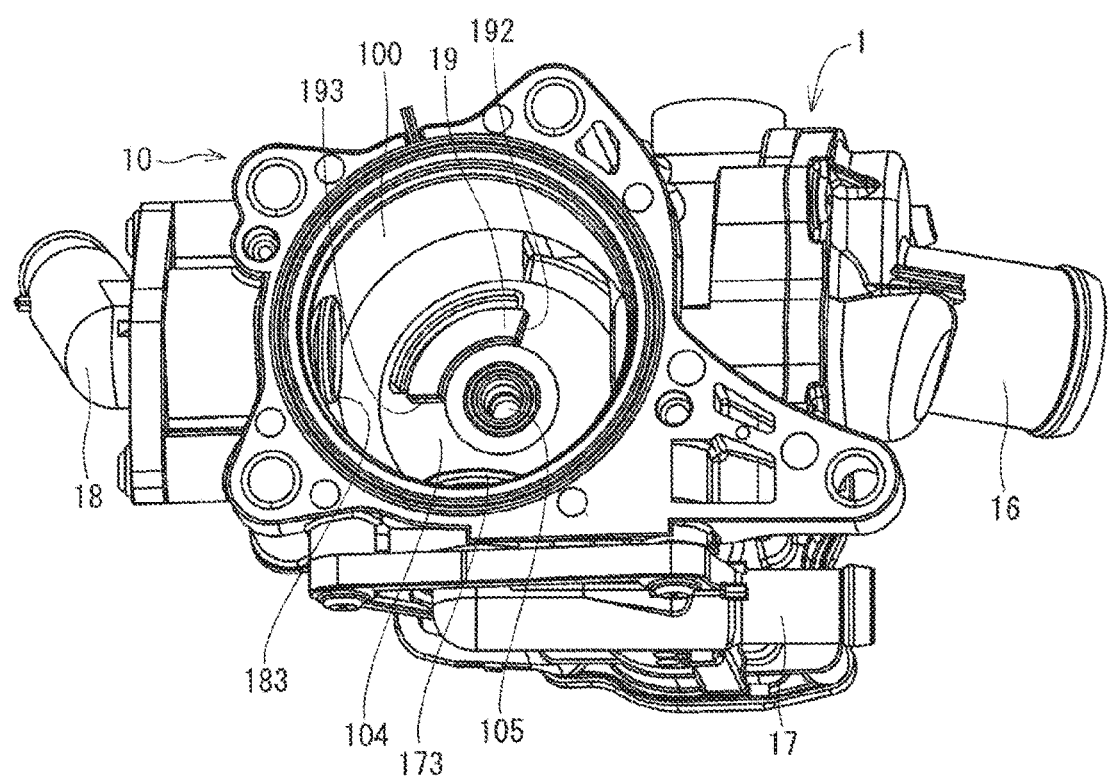
FIG. 14 is a perspective view of a valve housing of the valve device according to the first embodiment.

As shown in FIG. 14, the limiter 19 is a portion of the housing bottom 104 that is substantially shaped in an arcuate form and is formed at an end surface 109 of the housing bottom 104 that is opposed to the valve member bottom 21. In the first embodiment, the limiter 19 is formed integrally with the first housing 10 in one piece. The limiter 19 projects from the end surface 109 in the axial direction of the rotational axis RA25 such that a distal end of the limiter 19 is placed in the recess 210, as shown in FIG. 2. As shown in FIG. 14, the limiter 19 is formed such that two opposite side surfaces 191, 192, which are opposed to each other in the circumferential direction, radially outwardly extends in the view taken from the rotational axis RA25.

Figure 15:
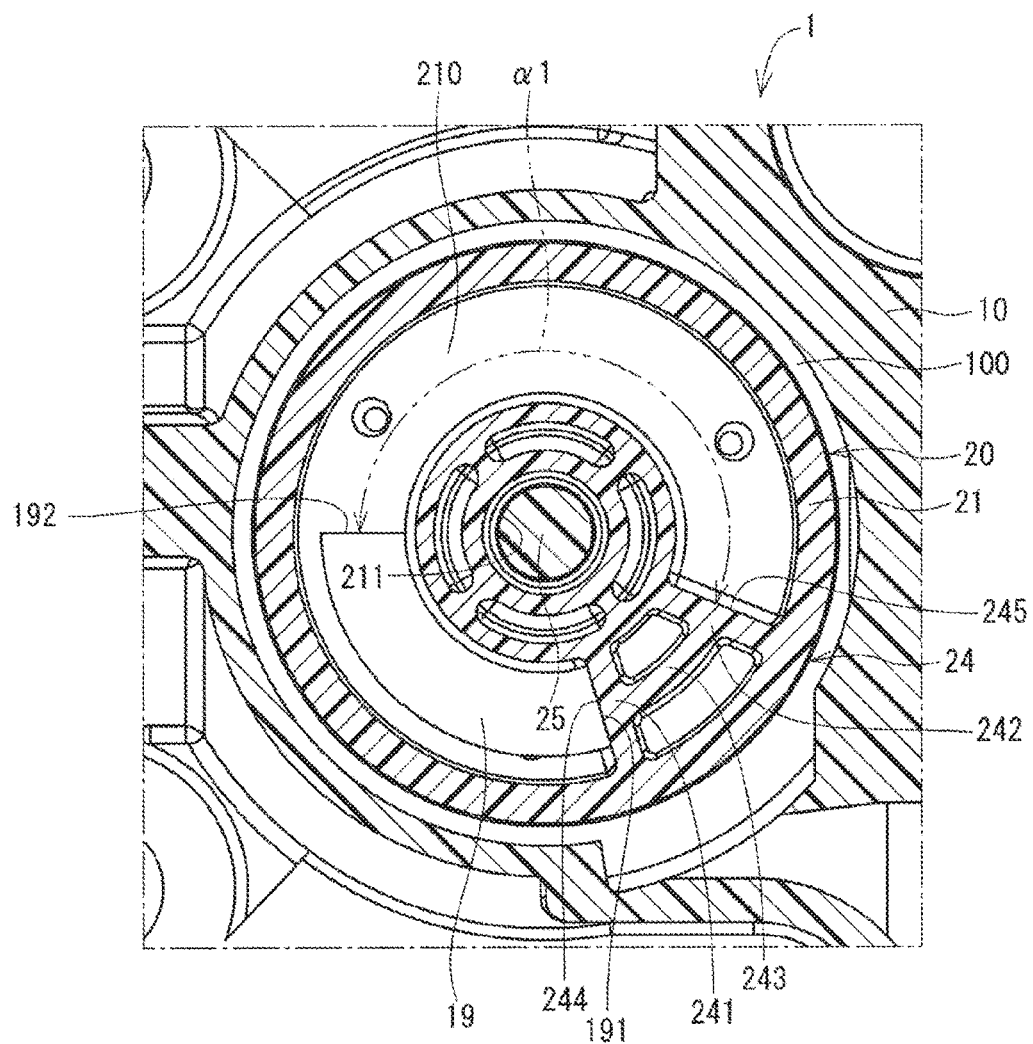
FIG. 15 is a cross-sectional view taken along line XV-XV in FIG. 2.

Now, a positional relationship between the contact portion 24 and the limiter 19 will be described with reference to FIG. 15. FIG. 15 is a cross-sectional view taken along XV-XV line in FIG. 2, showing a cross section of a portion, at which the contact portion 24 and the limiter 19 are engaged with each other, in a plane perpendicular to the rotational axis RA25. In FIG. 15, a rotational direction of the valve member 20 will be referred to as a clockwise direction or a counterclockwise direction for the sake of convenience.

FIG. 15 shows a state where a side surface 244 of the side wall 241 of the contact portion 24 contacts the side surface 191 of the limiter 19. In this state, the rotation of the valve member 20 in the clockwise direction is limited.

In contrast, when the valve member 20 is rotated in the counterclockwise direction from the state shown in FIG. 15, a side surface 245 of the side wall 242 of the contact portion 24, contacts the side surface 192 of the limiter 19. In this way, the rotation of the valve member 20 in the counterclockwise direction is limited.

Specifically, due to the engagement between the contact portion 24 and the limiter 19 in the circumferential direction of the valve member 20, the rotation of the valve member 20 is enabled only within an angular range that is indicated by a dot-dot-dash line α1 in FIG. 15.

(a) In the fluid control valve 1 of the first embodiment, the contact portion 24, which is configured to contact the limiter 19 provided to limit the rotation of the valve member 20, is formed at the recess 210 of the valve member 20. In this way, the valve member 20 can have the contact portion 24 that does not project from the valve member 20, so that a size of the valve member 20 can be reduced in comparison to a case where the contact portion 24 projects from the valve member 20. Therefore, the rotational angle of the valve member 20 can be limited within a desirable angular range while implementing a compact size of the valve member 20.

(b) In the valve member bottom 21, the recess 210 is formed in the valve member bottom 21 as follows. Specifically, the recess 210 is progressively axially spaced away from the housing bottom 104 in a radially inward direction from an outer peripheral part of the valve member bottom 21, at which the first tubular portion 22 is formed, toward the through hole 211. In this way, the recess 210 is formed such that a depth of the recess 210 is progressively reduced from a center part of the valve member bottom 21, at which the shaft 25 is placed, toward the radially outer side. Therefore, the flow resistance of the coolant, which flows through the space 200, can be reduced. Thus, the flow of the coolant in the space 200 can be smoothly guided to the valve-member-side openings 222, 232, 233.

(c) In the case where the recess 210 is formed such that the depth of the recess 210 is progressively reduced from the center part of the valve member bottom 21, at which the shaft 25 is placed, toward the radially outer side, a part of the contact portion 24, which is adjacent to the rotational axis RA25, can have a relatively large length in the axial direction of the rotational axis RA25. In this way, a contact surface area of the contact portion 24, which contacts the limiter 19, can be increased, so that a damage of the contact portion 24 caused by a stress applied to the contact portion 24 through the engagement of the contact portion 24 with the limiter 19 can be limited.

(d) Furthermore, the valve member 20 includes the plurality of ribs 212 that are formed at the surface of the valve member 20, which is located on the side where the space 200 is placed. In this way, the coolant, which flows in the space 200, can be smoothly guided from the center part of the valve member bottom 21, at which the shaft 25 is placed, toward the radially outer side.

(e) Furthermore, the ribs 212 are formed at the surface of the valve member bottom 21, which is located on the side where the space 200 is placed, so that the strength of the valve member bottom 21 can be increased. In this way, the damage of the contact portion 24 caused by the stress applied to the contact portion 24 through the engagement of the contact portion 24 with the limiter 19 can be reliably limited.

(f) Furthermore, the limiter 19 is formed integrally with the first housing 10 in one piece. Thereby, positional deviation of the limiter 19 relative to the first housing 10, which would be caused by the engagement of the limiter 19 to the contact portion 24, can be limited.

(g) The side surfaces 244, 245 of the contact portion 24 and the side surfaces 191, 192 of the limiter 19 radially outwardly extend in the view taken from the rotational axis RA25. In this way, the contact surface area between the side surface 244 and the side surface 191 can be increased when the side surface 244 contacts the side surface 191. Also, the contact surface area between the side surface 245 and the side surface 192 can be increased when the side surface 245 contacts the side surface 192. Therefore, it is possible to reliably limit the damage of the contact portion 24 and the limiter 19 caused by the stress generated through the engagement between the contact portion 24 and the limiter 19.

(h) The contact portion 24 includes the rib 243 that supports the two side walls 241, 242. In this way, the required amount of resin, which is required to form the contact portion 24, can be reduced in comparison to a case where the contact portion is shaped into a solid block form.

(i) The peripheral part of the first housing 10, which forms the insertion hole 101, has the groove 102 that is configured to receive the O-ring 110 at the time of assembling the fluid control valve 1 to the cylinder head 501. Furthermore, the first housing 10 is made of the resin. Thereby, at the time of inserting the bearing 14 in the insertion hole 101, it is possible to limit the deformation of the bearing 14 that is caused by the deformation of the groove 102.

(j) When the bearing 14 is viewed in the axial direction of the rotational axis RA25 of the shaft 25, an angular interval between each adjacent two of the connecting portions 143 is set to be the identical angle α. Thereby, a force, which is generated at the time of press fitting the bearing 14 into the first housing 10, can be equally spread to limit deviation and/or the deformation of the bearing 14.

(k) In the bearing 14, the ring portion 142 and the bearing portion 140 are offset from each other along the rotational axis RA25. In this way, it is possible to limit direct application of the force, which is generated at the time of press fitting the bearing 14 into the first housing 10, to the bearing portion 140.

(l) The connecting portions 143 are formed such that the end part of each connecting portion 143, which is joined to the center portion 141, has the length that is substantially equal to the length of the center portion 141, and the length of each connecting portion 143, which is measured in the axial direction of the rotational axis RA25, is progressively decreased in the direction away from the rotational axis RA25. In this way, deformation of the bearing 14, which is generated at the time of press fitting the bearing 14 into the first housing 10, can be converted into flexure of the connecting portion 143, which has a relatively large size, so that the force, which is applied to the bearing portion 140, can be reduced.

(m) The gap, through which the coolant can flow, is formed between each adjacent two of the connecting portions 143. The rigidity of the portion of the bearing 14, at which the gap is formed, becomes relatively small. Therefore, the force, which is generated at the time of press fitting the bearing 14 to the first housing 10, can be converted into flexure of this portion that has the relatively small rigidity, and thereby the force, which is applied to the bearing portion 140, can be reduced.

(n) At the time of press fitting the bearing 14 to the first housing 10, the tilt surface 144 of the bearing 14 can be brought into contact with the contact surface 103 of the first housing 10, so that the bearing 14 can be assembled to a predetermined location of the first housing 10. In this way, it is possible to limit occurrence of rotational abnormality caused by the deviation between the shaft 25 and the bearing 14.

(o) The coolant, which intrudes into the portion of the through hole 105 located on the bearing portion 106 side through the seal member 107, is drained to the outside through the drain passage 108 of the first housing 10, and thereby the intrusion of the coolant of the valve member receiving space 100 into the receiving chamber 150 is limited. In this way, it is possible to limit a damage of the rotational angle sensor 152 received in the receiving chamber 150, a damage of the gears, such as the valve gear 156 received in the receiving chamber 150, and a damage of the motor 157 exposed in the receiving chamber 150 caused by application of the coolant to these components. Furthermore, when the coolant is drained through the drain passage 108, it is possible to find the leakage of the coolant through the seal member 107 at an early stage. Therefore, the failure of the seal member 107 can be detected at the early stage.

(p) In the fluid control valve 1, the motor gear 153, the first intermediate gear 154, the second intermediate gear 155 and the valve gear 156 are arranged such that in the view taken from the first housing 10 side, the location, at which the first small gear 1542 and the second large gear 1551 are meshed with each other, the location, at which the valve gear 156 and the second small gear 1552 are meshed with each other, and the location, at which the motor gear 153 and the first large gear 1541 are meshed with each other, are arranged one after the other in this order. In this way, the second intermediate gear 155 can be placed such that the first intermediate gear 154 and the valve gear 156 are placed adjacent to each other in a direction that is substantially perpendicular to the rotational axis RA25 of the shaft 25. Therefore, the size of the fluid control valve 1, which is measured in the direction substantially perpendicular to the rotational axis RA25, can be reduced.

Furthermore, as shown in FIG. 7, the first large gear 1541 of the first intermediate gear 154 is formed such that the first large gear 1541 overlaps with the portion of the second gear shaft 1553 of the second intermediate gear 155. In this way, the size of the fluid control valve 1, which is measured in the direction substantially perpendicular to the rotational axis RA25 of the fluid control valve 1, can be further reduced. Also, the first intermediate gear 154 can limit removal of the second intermediate gear 155 from the first housing 10.

(q) Furthermore, the portion of the first gear shaft 1543 of the first intermediate gear 154, which is inserted into the first housing 10, has the grooves 1544, and the portion of the second gear shaft 1553 of the second intermediate gear 155, which is inserted into the first housing 10, has the grooves 1554. In this way, the length of each inserted portion can be reduced, and thereby the size of the fluid control valve 1, which is measured in the axial direction of the rotational axis RA25, can be reduced.

(r) Previously, in a case where a shaft, which is made of metal, is inserted into a valve member, which is made of resin, a stress, which is generated by a rotational torque of the valve member, and a stress, which is generated by a force that is applied in a direction substantially perpendicular to a rotational axis of the shaft, are concentrated at the same part of the portion of the valve member, into which the shaft is inserted, so that an excess stress is applied to this part. Therefore, the valve member may possibly be damaged.

In the fluid control valve 1, the insert portion 253 of the shaft 25 is formed such that the cross section of the insert portion 253, which is substantially perpendicular to the rotational axis RA25, is shaped into the polygonal form. The shaft 25 includes the grooves 254, 255, which have the outer diameter smaller than the outer diameter of the insert portion 253 and are formed on the two opposite sides, respectively, of the insert portion 253. In this way, the stress, which is generated by the rotational torque of the valve member 20, is applied to the insert portion 253. In contrast, the stress, which is generated when a force is applied from any of the springs 165, 175, 185 of the pipelines 16, 17, 18 to the shaft 25 in the direction substantially perpendicular to the rotational axis RA25 of the shaft 25, is applied to the grooves 254, 255 and is dispersed. Therefore, the damage of the valve member 20 can be limited.

(s) Each of the radiator pipe line 16, the oil cooler pipe line 17 and the air conditioning pipe line 18 has the corresponding plate 166, 176, 186 placed on the radially inner side of the corresponding spring 165, 175, 185. Each of the plates 166, 176, 186 contacts the valve member 20 side end surface of the corresponding pipe 161, 171, 181 and the outer peripheral wall surface of the corresponding sleeve 163, 173, 183. In this way, the plate 166, 176, 186 maintains the inner diameter of the spring 165, 175, 185 and limit movement of the spring 165, 175, 185 in the radial direction. Thus, occurrence of sliding between the spring 165, 175, 185 and the sleeve 163, 173, 183 and occurrence of sliding between the spring 165, 175, 185 and the first housing 10 can be limited.

(t) The valve member 20 has the recess 201 that is formed at the second tubular portion 23 and is located between the first tubular portion 22 and the second tubular portion 23. In this way, the size of the fluid control valve 1, which is measured in the direction substantially perpendicular to the rotational axis RA25, can be further reduced while limiting the interference between: the seat 162 of the radiator pipe line 16, which is configured to contact the outer wall surface 221 of the first tubular portion 22; and the seat 172 of the oil cooler pipe line 17 and the seat 182 of the air conditioning pipe line 18, each of which is configured to contact the outer wall surface 231 of the second tubular portion 23.

Second Embodiment

A valve device according to a second embodiment will be described with reference to FIGS. 16 to 19. In the second embodiment, the location of the contact portion and the location of the limiter are different from those of the first embodiment.

FIGS. 16 to 19 show a fluid control valve 2 (serving as a valve device) according to a second embodiment. The fluid control valve 2 includes the first housing 10, a bearing 39, the second housing 15, the radiator pipe line 16, the oil cooler pipe line 17, the air conditioning pipe line 18, the valve member 20, a connecting member 30 and the shaft 25.

The bearing 39 is provided at the insertion hole 101. The bearing 39 includes the center portion 141, the ring portion 142, the plurality of connecting portions 143 and a limiter 394.

Figure 16:
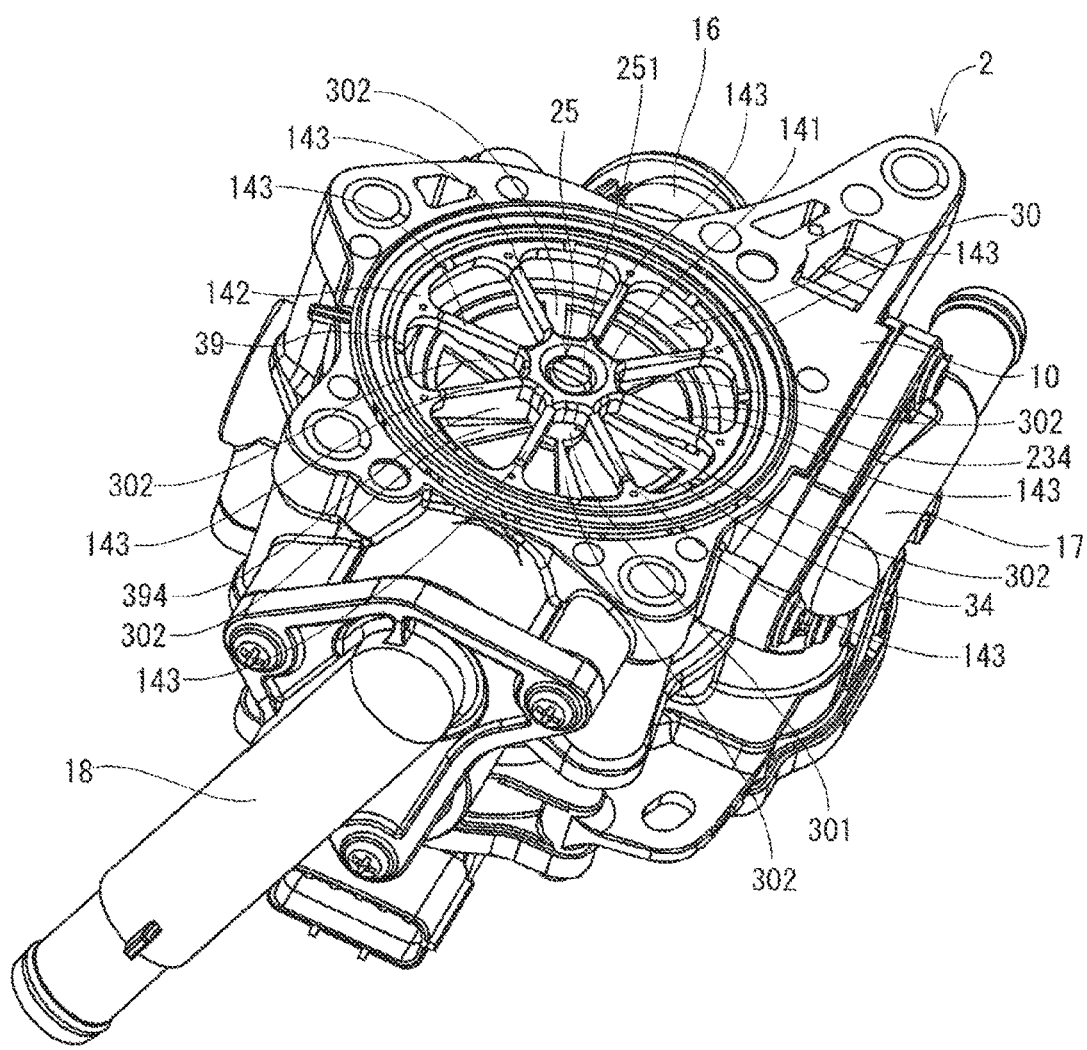
FIG. 16 is a perspective view of a valve device according to a second embodiment.
Figure 18:
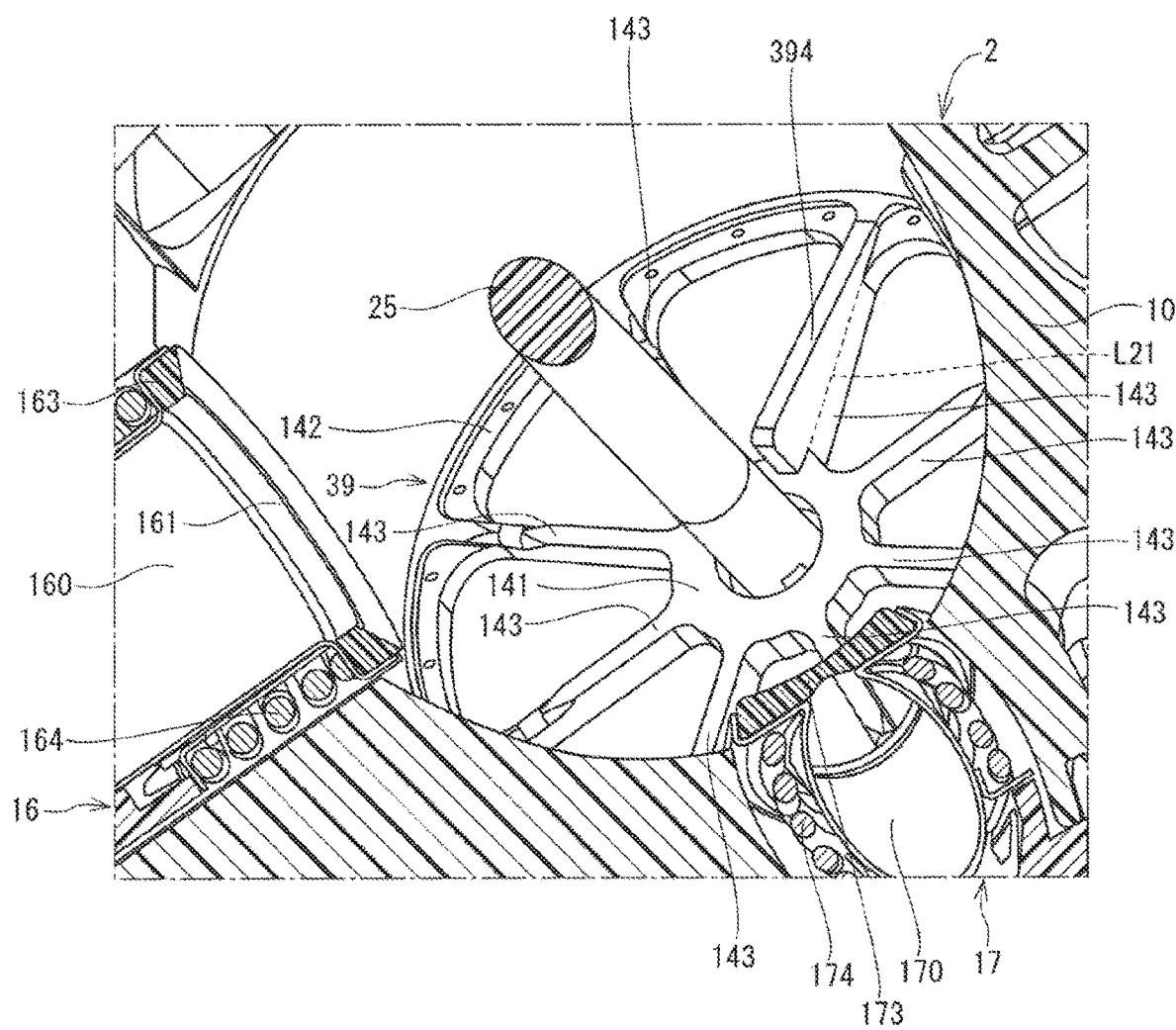
FIG. 18 is a partial cross-sectional view of the valve device of the second embodiment.
Figure 19:
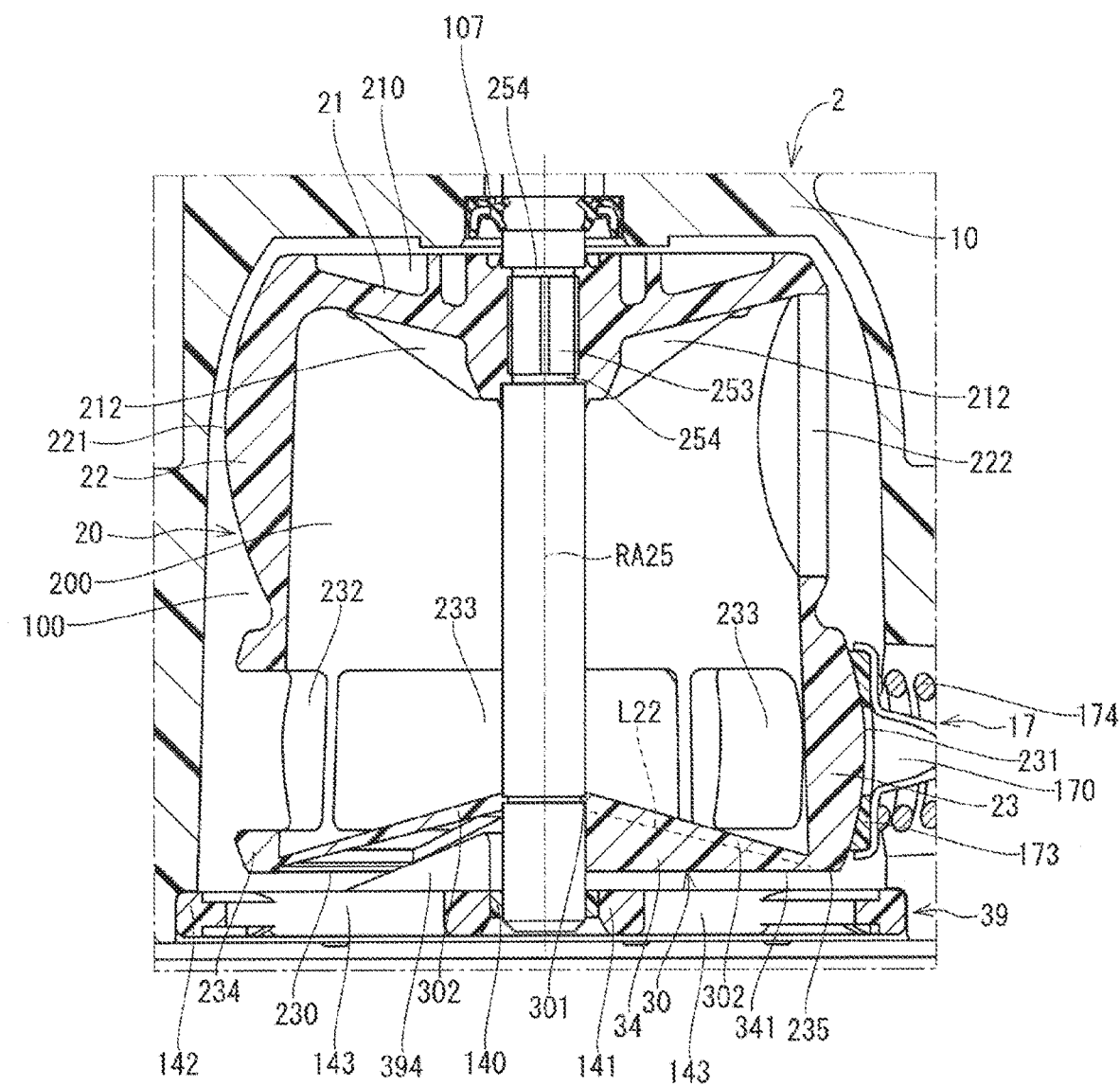
FIG. 19 is another partial cross-sectional view of the valve device of the second embodiment.

As shown in FIGS. 16, 18, the limiter 394 is formed to project from one of the connecting portions 143 toward the valve member 20 in the axial direction of the rotational axis RA25. As shown in FIG. 19, the limiter 394 is placed in the valve member receiving space 100, and an end part of the limiter 394, which is located on the valve member 20 side, is placed in the space 200. The limiter 394 is formed as follows. Specifically, a projecting height of the limiter 394, which axially projects toward the valve member 20, is progressively increased in a radially inward direction directed from the ring portion 142 toward the center portion 141. In FIG. 18, a boundary between the corresponding connecting portion 143 and the limiter 394 is indicated by a dotted line L21.

The connecting member 30 is formed between the shaft 25 and a peripheral part 234 of the second tubular portion 23 (serving as one end part of the valve member in the axial direction of the rotational axis), which forms the flow inlet 230. The connecting member 30 includes: a center portion 301 that is placed on a radially outer side of the one end part 251 of the shaft 25; a plurality of connecting portions 302, which connect between the peripheral part 234 of the second tubular portion 23 and the center portion 301; and a contact portion 34. The connecting member 30 is formed integrally with the valve member 20 in one piece.

The connecting portions 302 are arranged one after the other around the center portion 301 and radially outwardly extend from the center portion 301 to the peripheral part 234 of the second tubular portion 23. A gap, through which the coolant can flow, is formed between each adjacent two of the connecting portions 302. As shown in FIG. 19, the connecting portions 302 are respectively formed to tilt relative to the rotational axis RA25. Specifically, each of the connecting portions 302 is axially progressively raised toward the valve member bottom 21 in a radially inward direction from the peripheral part 234 of the second tubular portion 23 toward the center portion 301.

Figure 17:
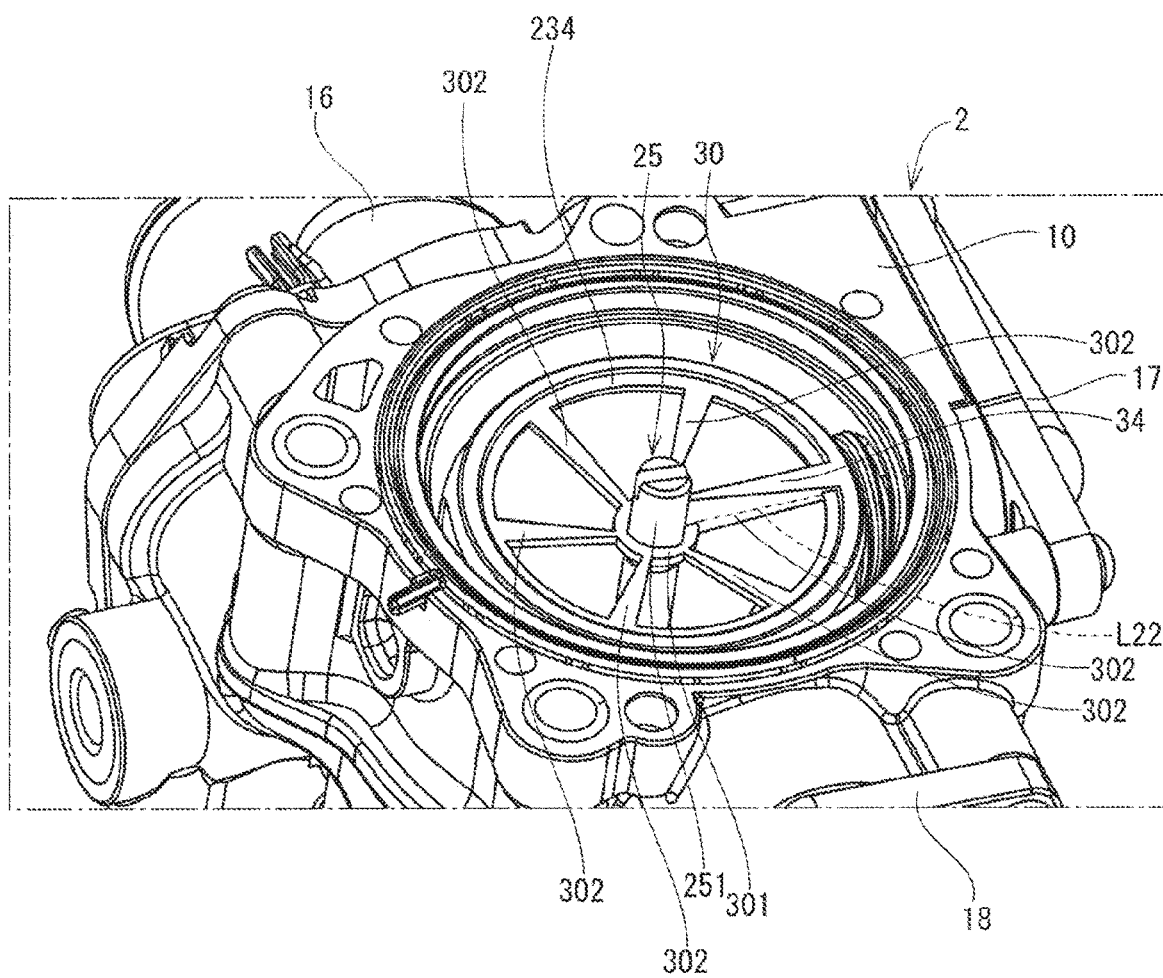
FIG. 17 is a partial enlarged view of the valve device of the second embodiment.

The contact portion 34 is formed at an opposite side of the one of the connecting portions 302, which is opposite from the valve member bottom 21. As shown in FIG. 19, an axial length of the contact portion 34, which is measured in the axial direction of the rotational axis RA25, is progressively reduced in a radially outward direction from the center portion 301 toward the peripheral part 234 of the second tubular portion 23. In the axial direction of the rotational axis RA25, an axial location of an end surface 341 of the contact portion 34, which is located on the bearing 39 side, is the same as an axial location of an end surface 235 of the peripheral part 234 of the second tubular portion 23, which is located on the bearing 39 side. In FIGS. 17 and 19, a boundary between the corresponding connecting portion 302 and the contact portion 34 is indicated by a dotted line L22.

In the fluid control valve 2 of the second embodiment, the limiter 394 is formed at the bearing 39, which supports the one end part 251 of the shaft 25. The contact portion 34, which is configured to contact the limiter 394, is formed at the connecting member 30 that is coupled to the one end part 251 of the shaft 25. In the axial direction of the rotational axis RA25, an axial location of an end surface 341 of the contact portion 34 is the same as an axial location of the end surface 235 of the second tubular portion 23. Specifically, the contact portion 34 is formed at the space 200 of the valve member 20 (serving as a space of the valve member). In this way, the second embodiment achieves the advantages (a), (d) and (i)-(t) of the first embodiment.

Third Embodiment

A valve device according to a third embodiment will be described with reference to FIGS. 20 and 21. In the third embodiment, the location of the contact portion and the location of the limiter are different from those of the first embodiment.

Figure 20:
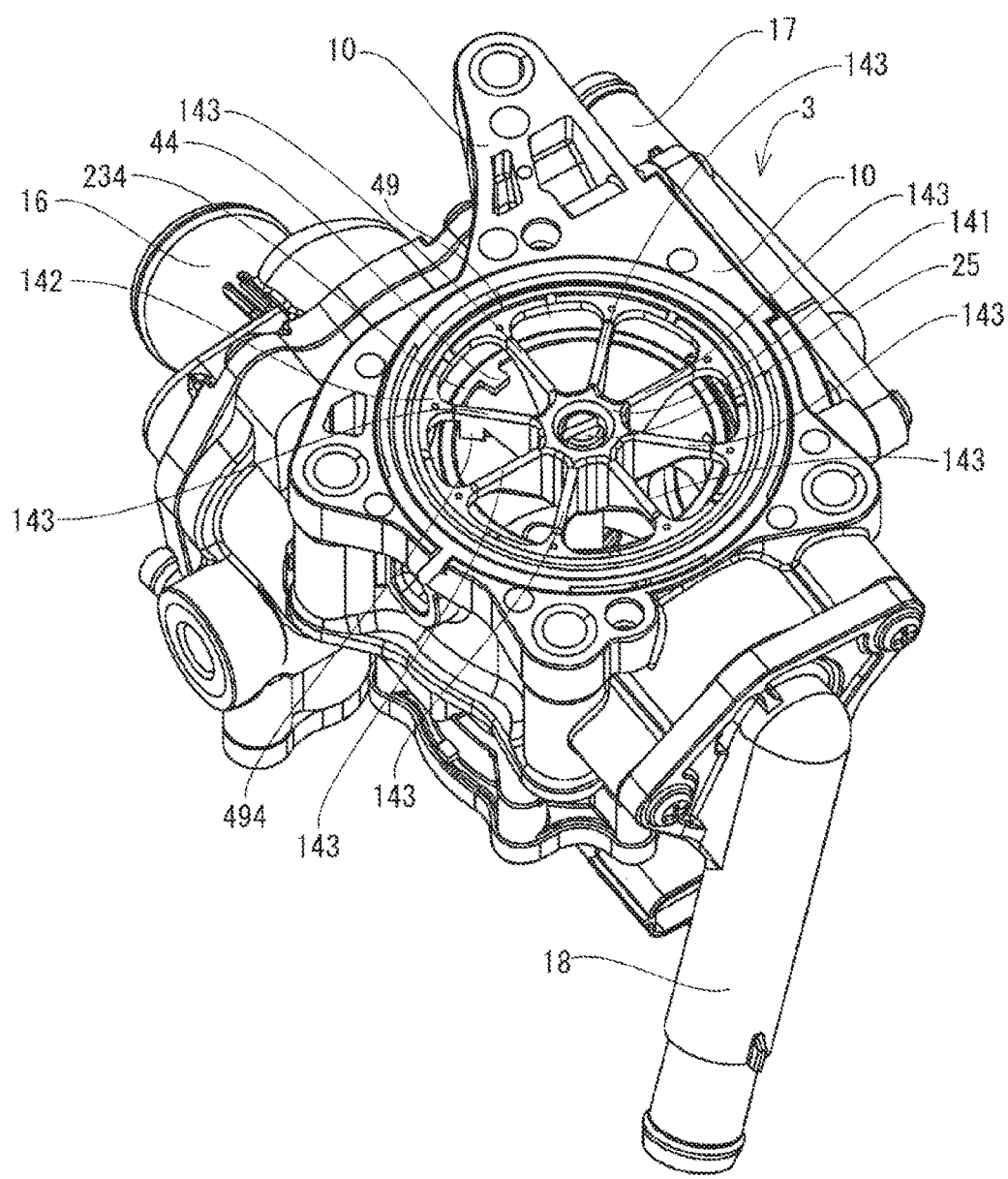
FIG. 20 is a perspective view of a valve device according to a third embodiment.
Figure 21:
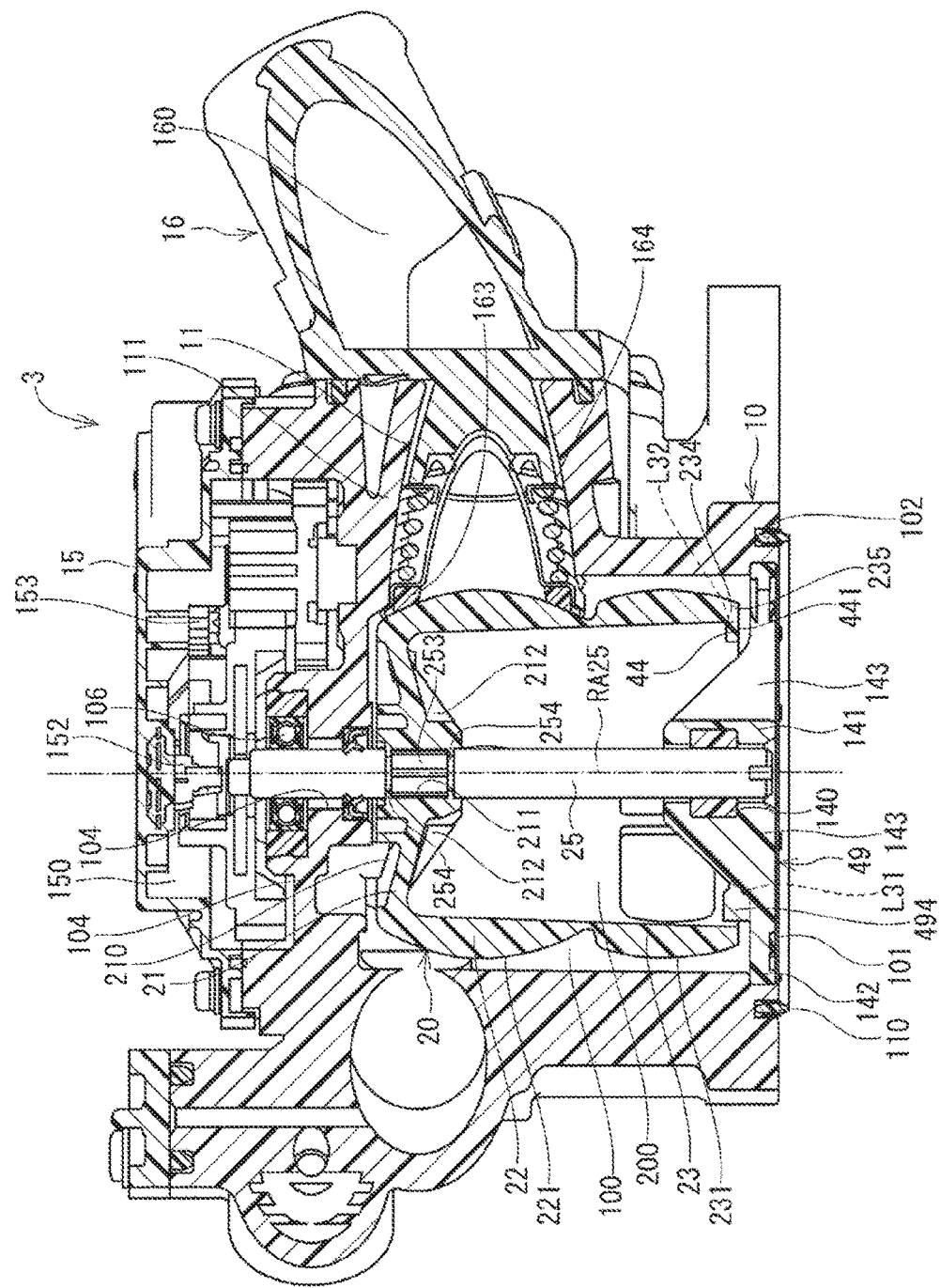
FIG. 21 is a cross-sectional view of the valve device of the third embodiment.

FIGS. 20 and 21 show a fluid control valve 3 (serving as a valve device) according to a third embodiment. The fluid control valve 3 includes the first housing 10, a bearing 49, the second housing 15, the radiator pipe line 16, the oil cooler pipe line 17, the air conditioning pipe line 18, the valve member 20, a contact portion 44 and the shaft 25.

The bearing 49 is provided at the insertion hole 101. The bearing 49 includes the center portion 141, the ring portion 142, the plurality of connecting portions 143 and a limiter 494.

As shown in FIG. 20, the limiter 494 projects from one of the connecting portions 143 in the axial direction of the rotational axis RA25 toward the valve member bottom 21. As shown in FIG. 21, the limiter 494 is placed in the valve member receiving space 100, and an end part of the limiter 494, which is located on the valve member 20 side, is placed in the space 200. The limiter 494 is placed adjacent a connection between the ring portion 142 and the corresponding connecting portion 143, i.e., is placed adjacent to a radially outer end of the bearing 49. In FIG. 21, a boundary between the corresponding connecting portion 143 and the limiter 494 is indicated by a dotted line L31.

As shown in FIGS. 20 and 21, the contact portion 44 radially inwardly projects from the peripheral part 234 of the second tubular portion 23. The contact portion 44 is formed integrally with the valve member 20 in one piece. In the axial direction of the rotational axis RA25, an axial location of an end surface 441 of the contact portion 44, which is located on the bearing 49 side, is the same as an axial location of the end surface 235 of the second tubular portion 23. In FIG. 21, a boundary between the peripheral part 234 and the contact portion 44 is indicated by a dotted line L32.

In the fluid control valve 3 of the third embodiment, the limiter 494 is formed at the bearing 49, which supports the one end part 251 of the shaft 25. Furthermore, the contact portion 44, which is configured to contact the limiter 494, radially inwardly projects from the peripheral part 234 of the second tubular portion 23. In the axial direction of the rotational axis RA25, the axial location of the end surface 441 of the contact portion 44 is the same as the axial location of the end surface 235 of the second tubular portion 23. Specifically, the contact portion 44 is formed at the space 200 of the valve member 20 (serving as the space of the valve member). In this way, the third embodiment achieves the advantages (a), (d) and (i)-(t) of the first embodiment.

Fourth Embodiment

A valve device according to a fourth embodiment will be described with reference to FIGS. 22 and 23. In the fourth embodiment, the shape of the contact portion is different from that of the first embodiment.

Figure 22:
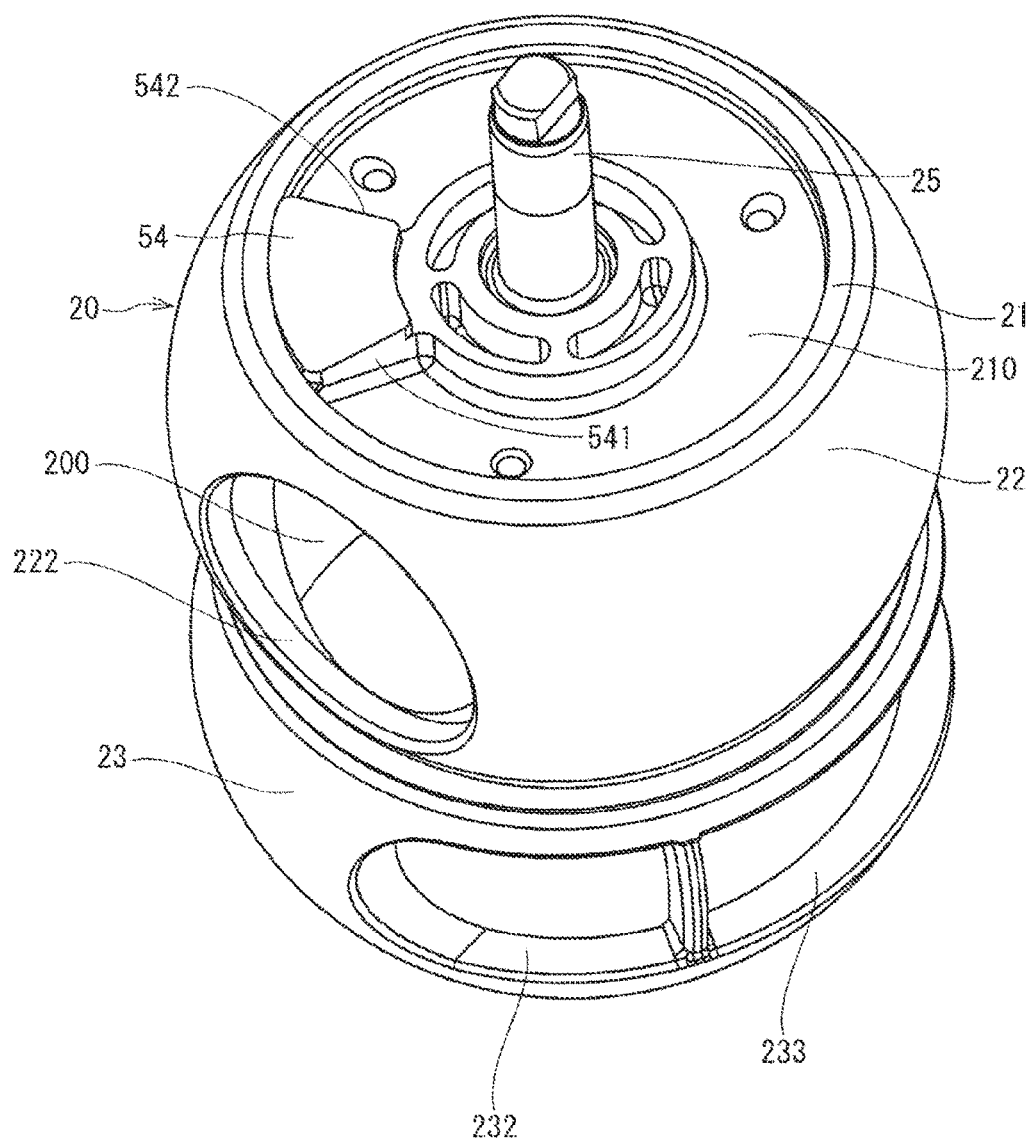
FIG. 22 is a perspective view of a valve member of the valve device according to a fourth embodiment.
Figure 23:
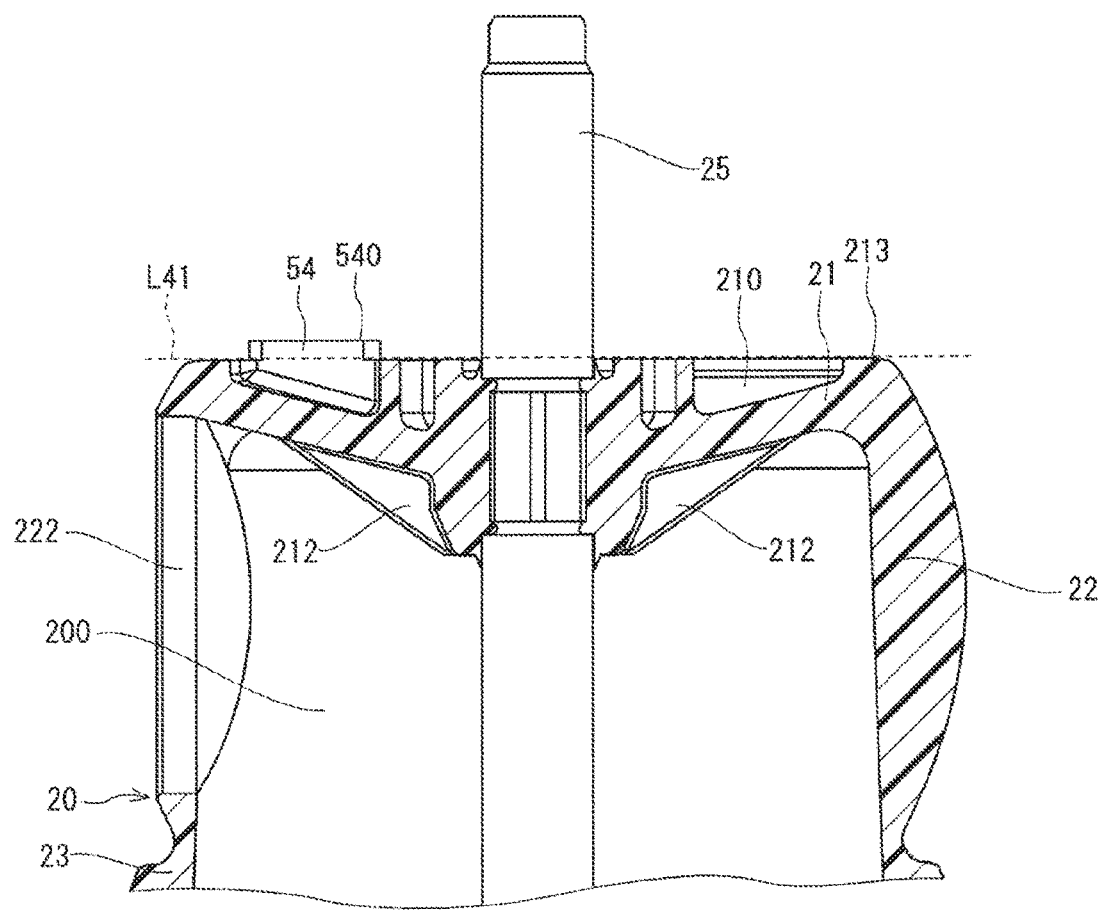
FIG. 23 is a partial cross-sectional view of the valve member of the valve device according to the fourth embodiment.

FIGS. 22 and 23 show a valve member 20 of the fluid control valve (serving as the valve device) according to the fourth embodiment. The fluid control valve of the fourth embodiment includes the first housing 10, the bearing 14, the second housing 15, the radiator pipe line 16, the oil cooler pipe line 17, the air conditioning pipe line 18, the valve member 20, a contact portion 54 and the shaft 25.

The contact portion 54 is formed at the recess 210 of the valve member bottom 21. The contact portion 54 is configured to contact the limiter 19. Two side surfaces 541, 542, which are configured to contact the limiter 19 of the contact portion 54, radially outwardly extend in the view taken from the rotational axis RA25.

As shown in FIG. 23, in the axial direction of the rotational axis RA25, an axial location of an end surface 540 of the contact portion 54, which is located on the opposite side of the valve member bottom 21 that is opposite from the space 200, is on the housing bottom 104 side of the axial location of the end surface 213 of the valve member bottom 21 (see a dotted line L41 in FIG. 23).

In the fluid control valve of the fourth embodiment, although the contact portion 54, which is configured to contact the limiter 19, is provided at the recess 210 of the valve member bottom 21, a portion of the contact portion 54 projects from the recess 210. In this way, the fourth embodiment achieves the advantages (a)-(g) and (i)-(t) of the first embodiment.

Furthermore, a length of the contact portion 54, which is measured in the axial direction of the rotational axis RA25, is larger than a length of the contact portion 24 of the first embodiment, which is measured in the axial direction of the rotational axis RA25. Therefore, the contact portion 54 can increase a contact surface area between the contact portion 54 and the limiter 19. In this way, the damage of the contact portion 54, which is caused by the stress applied to the contact portion 54 through the engagement of the contact portion 54 with the limiter 19, can be reliably limited.

Fifth Embodiment

A valve device according to a fifth embodiment will be described with reference to FIGS. 24 and 25. In the fifth embodiment, the location of the contact portion is different from that of the first embodiment.

Figure 24:
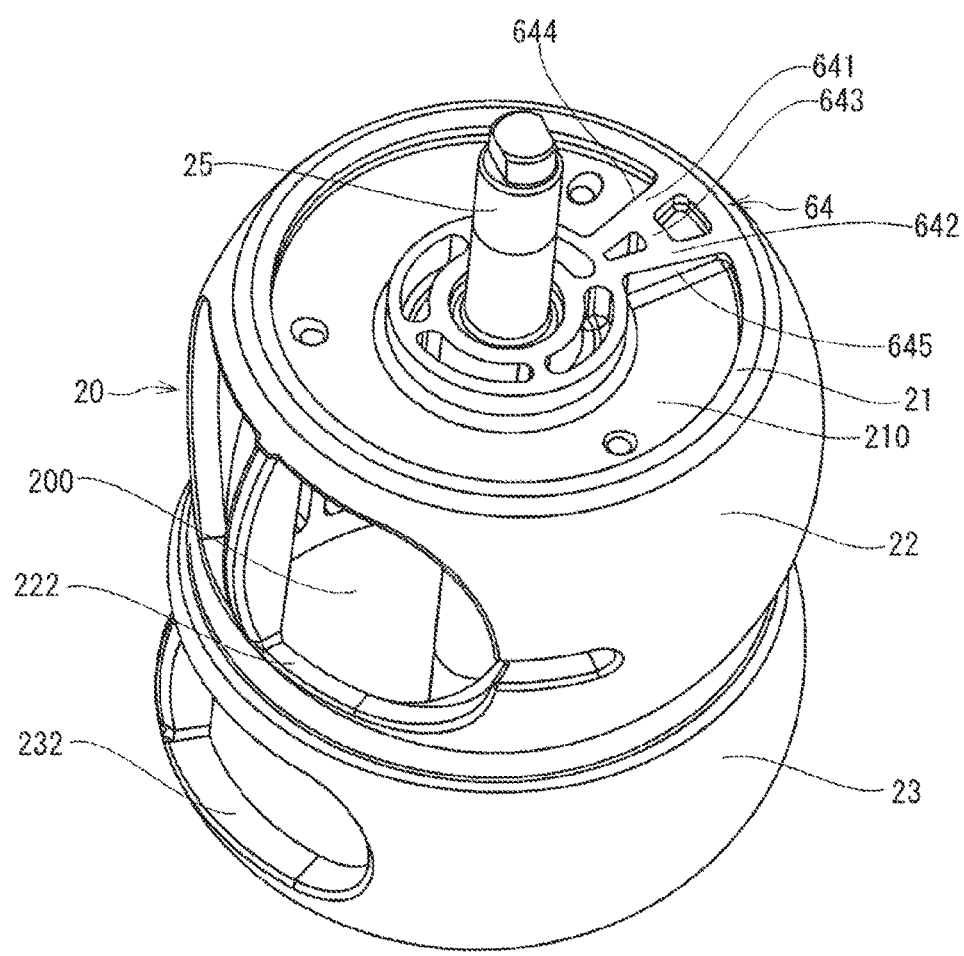
FIG. 24 is a perspective view of a valve member of a valve device according to a fifth embodiment.
Figure 25:
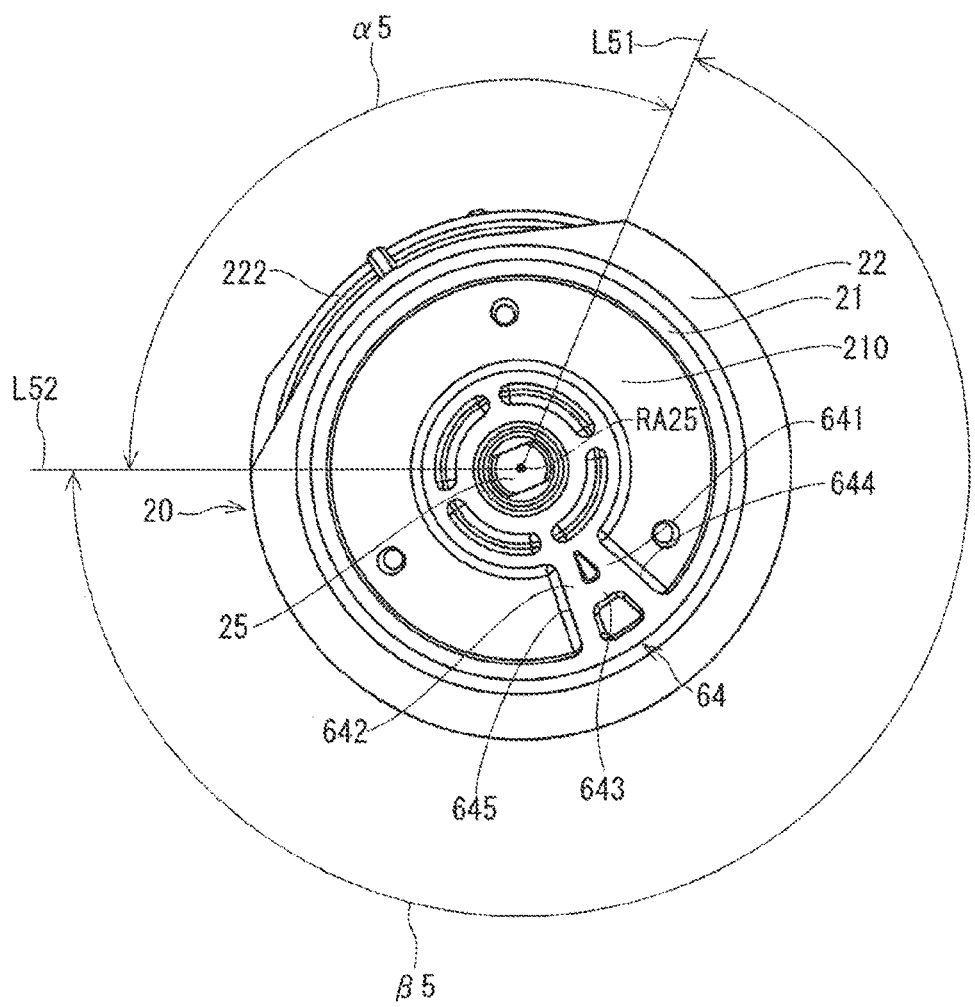
FIG. 25 is a top view of the valve member of the valve device according to the fifth embodiment.

FIGS. 24 and 25 show the valve member 20 of the fluid control valve (serving as the valve device) according to the fifth embodiment. The fluid control valve of the fifth embodiment includes the first housing 10, the bearing 14, the second housing 15, the radiator pipe line 16, the oil cooler pipe line 17, the air conditioning pipe line 18, the valve member 20, a contact portion 64 and the shaft 25.

The contact portion 64 is formed at the recess 210 of the valve member bottom 21. The contact portion 64 includes two side walls 641, 642 and a rib 643.

As shown in FIGS. 24 and 25, the side walls 641, 642 radially extend along two different radial directions in the view taken from the rotational axis RA25.

The rib 643 extends between the side wall 641 and the side wall 642. The rib 643 supports the side walls 641, 642.

The contact portion 64 is formed such that a side surface 644 of the side wall 641 and a side surface 645 of the side wall 642 are configured to contact the limiter 19. The side surfaces 644, 645 radially outwardly extend in the view taken from the rotational axis RA25.

The fluid control valve of the fifth embodiment is characterized by a positional relationship between the location of the contact portion 64 and the location of a closest one 222 of the valve-member-side openings, which is closest to the contact portion 64 in the axial direction of the rotational axis RA25. Details of this positional relationship will be described with reference to FIG. 25.

FIG. 25 is a schematic diagram formed by projecting the valve member 20 and the contact portion 64 onto an imaginary plane that is perpendicular to the rotational axis RA25. As shown in FIG. 25, a projected figure of the contact portion 64, which is projected onto the imaginary plane that is perpendicular to the rotational axis RA25, is formed at a different location that is different from a location of a projected figure of the valve-member-side opening 222 (serving as an adjacent valve-member-side opening). Specifically, the projected figure of the contact portion 64 is indicated in an angular range β5 (a wider angular range between a solid line L51 and a solid line L52, which respectively extend through the rotational axis RA25) that is other than an angular range α5 (a narrower angular range between the solid line L51 and the solid line L52), in which the projected figure of the valve-member-side opening 222 is indicated.

In the fifth embodiment, in the imaginary plane, which is perpendicular to the rotational axis RA25, the projected figure of the contact portion 64 is indicated in the angular range β5 that is other than the angular range α5, in which the projected figure of the closest one 222 of the valve-member-side openings that is closest to the valve member bottom 21 is indicated. In this way, even when a relatively large stress is applied to the contact portion 64 upon contacting the contact portion 64 to the limiter 19, it is possible to limit deformation of the contact portion 64. Thus, according to the fifth embodiment, the advantages (a)-(t) of the first embodiment can be achieved, and the deformation and/or the damage of the valve member 20 can be reliably limited.

Sixth Embodiment

A valve device according to a sixth embodiment will be described with reference to FIG. 26. In the sixth embodiment, the shape of the valve member is different from that of the first embodiment.

Figure 26:
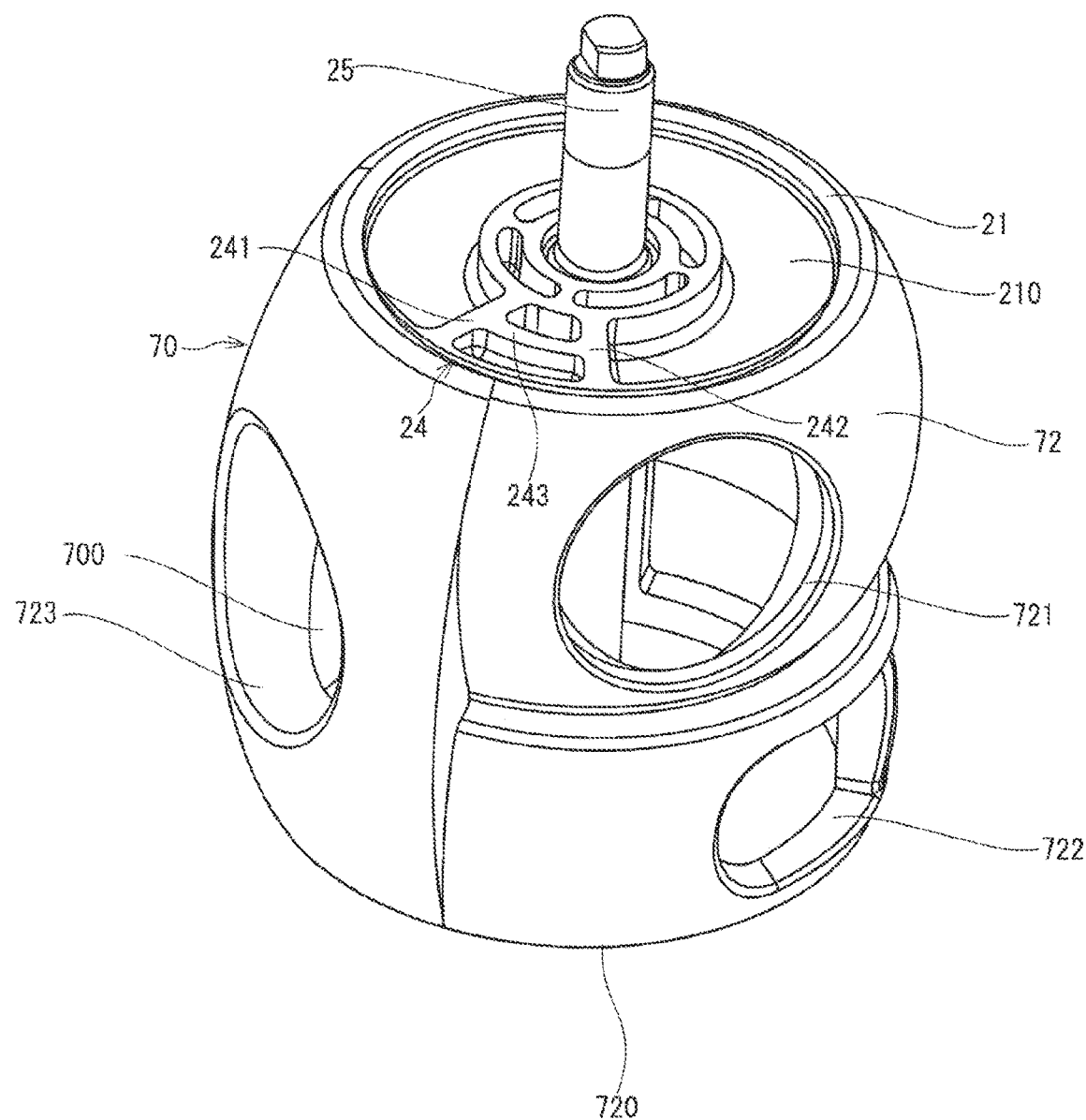
FIG. 26 is a perspective view of a valve member of a valve device according to a sixth embodiment.

FIG. 26 shows a valve member 70 of the fluid control valve (serving as the valve device) according to the sixth embodiment. The fluid control valve of the sixth embodiment includes the first housing 10, the bearing 14, the second housing 15, the radiator pipe line 16, the oil cooler pipe line 17, the air conditioning pipe line 18, the valve member 70, the contact portion 24 and the shaft 25. The valve member 70 is substantially shaped into a bottomed tubular form, and the valve member 70 is received in the valve member receiving space 100. The valve member 70 includes the valve member bottom 21 and a tubular portion 72 (serving as an outer peripheral wall of the valve member). The valve member 70 includes a space 700 (serving as a communication passage) that is formed in an inside of the valve member 70 by the valve member bottom 21 and the tubular portion 72.

The tubular portion 72 extends from the valve member bottom 21 toward an opposite direction that is opposite from the housing bottom 104. The tubular portion 72 includes a plurality of valve-member-side openings 721, 722, 723 (serving as remaining valve-member-side openings) that communicate between the space 700 and the outside of the tubular portion 72.

The valve-member-side opening 721 is located adjacent to the valve member bottom 21. The valve-member-side opening 721 is configured to communicate with the air conditioning passage 180 according to a rotational angle of the valve member 70.

The valve-member-side opening 722 is further spaced away from the valve member bottom 21 in comparison to the valve-member-side opening 721. The valve-member-side opening 722 is configured to communicate with the oil cooler passage 170 according to the rotational angle of the valve member 70.

The valve-member-side opening 723 overlaps with the valve-member-side opening 721 in the circumferential direction and also overlaps with the valve-member-side opening 722 in the circumferential direction. The valve-member-side opening 723 is configured to communicate with the radiator passage 160 according to the rotational angle of the valve member 70.

Furthermore, the tubular portion 72 includes a flow inlet 720 (serving as one valve-member-side opening) at an opposite side of the tubular portion 72 that is opposite from the valve member bottom 21 in the axial direction of the shaft 25.

In the sixth embodiment, the valve member 70 is formed such that the two valve-member-side openings 721, 722 overlap with each other in the axial direction of the rotational axis RA25, and the valve-member-side opening 723 overlaps with the valve-member-side opening 721 in the circumferential direction and also overlaps with the valve-member-side opening 722 in the circumferential direction. Even with this structure, the contact portion 24, which is provided at the recess 210 of the valve member bottom 21, can set a rotatable angle of the valve member 70 to a desirable angular range through engagement of the contact portion 24 to the limiter 19. In this way, the sixth embodiment achieves the advantages (a)-(t) of the first embodiment.

Other Embodiments

In the above embodiments, the fluid control valve (serving as the valve device) is applied in the cooling system that is configured to cool the engine. However, the technical filed, at which the fluid control valve is applied, should not be limited this technical field. The fluid control valve may be applied to a case where a flow of fluid is controlled by a rotational angle of the valve member relative to the valve housing.

In the above embodiment, the valve member is shaped into the bottomed tubular form. However, the shape of the valve member should not be limited to this. The valve member may be shaped into a spherical form, i.e., the valve member may be a ball valve.

In the above embodiments, the valve member bottom includes the ribs that are formed at the surface of the valve member bottom, which is located on the side where the space of the valve member is placed, such that in the view taken from the rotational axis, the ribs are radiated to extend radially outward. However, the configuration of the ribs should not be limited to the above-described one.

In the above embodiments, the valve housing includes the four housing-side openings, and the valve member includes the five valve-member-side openings. However, the number of the housing-side openings and the number of the valve-member-side openings should not be limited to these numbers.

In the above embodiments, each of the radiator pipe line, the oil cooler pipe line and the air conditioning pipe line has the plate, which has the cross section shaped into the L-shape, to limit occurrence of sliding between the spring and the sleeve and occurrence of sliding between the spring and the first housing. However, the member, which implements the above-described function, should not be limited to the plate. Modification of the member, which implements the above-described function, will be described with reference to FIGS. 27 and 28.

Figure 27:
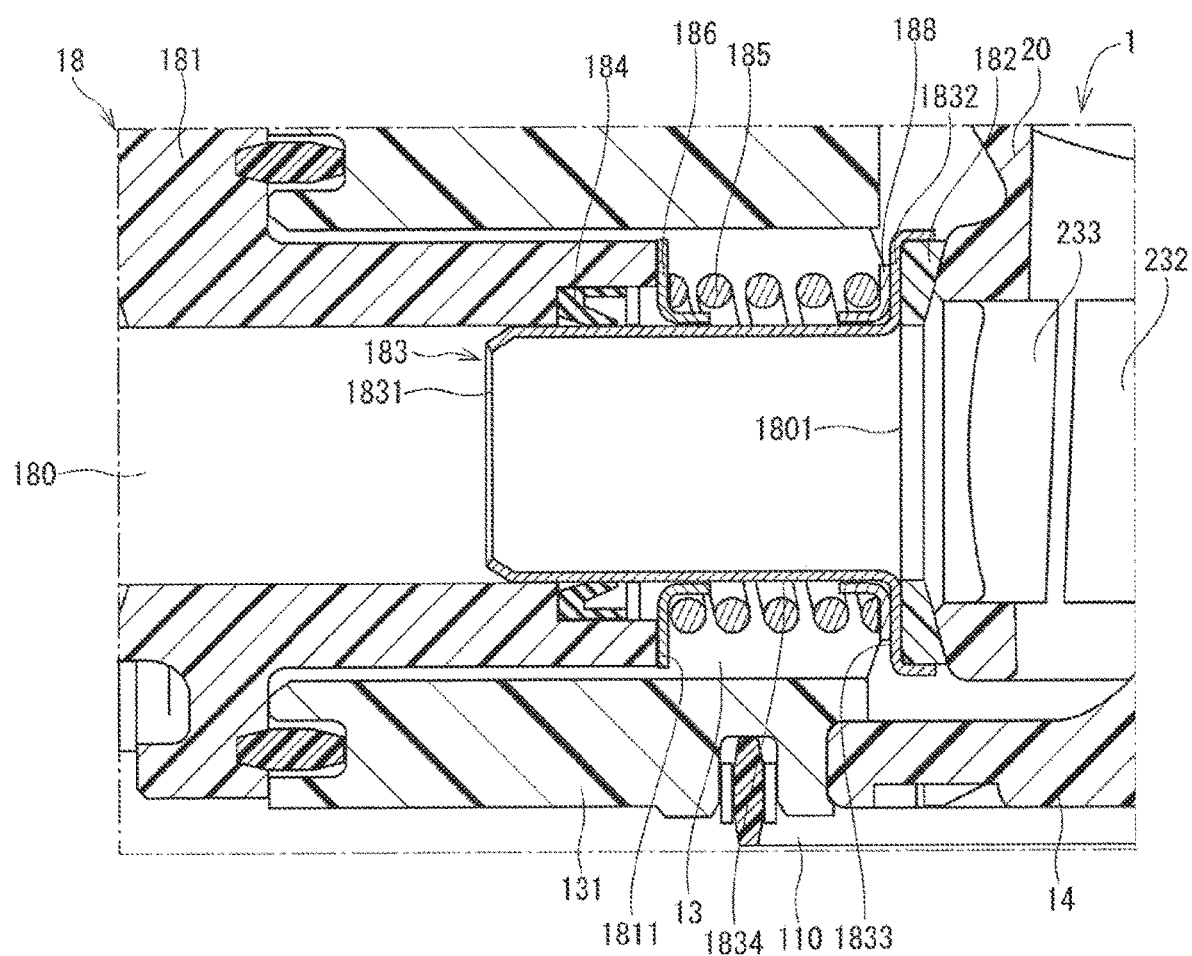
FIG. 27 is a partial cross-sectional view of a valve device according to another embodiment.

In the modification shown in FIG. 27, there are provided two plates. Among the two plates, the plate 187 has a cross section, which is shaped into an L-shape, and the plate 187 contacts the end surface 1833 of the sleeve 183 and the outer wall surface 1834 of the sleeve 183.

Figure 28:
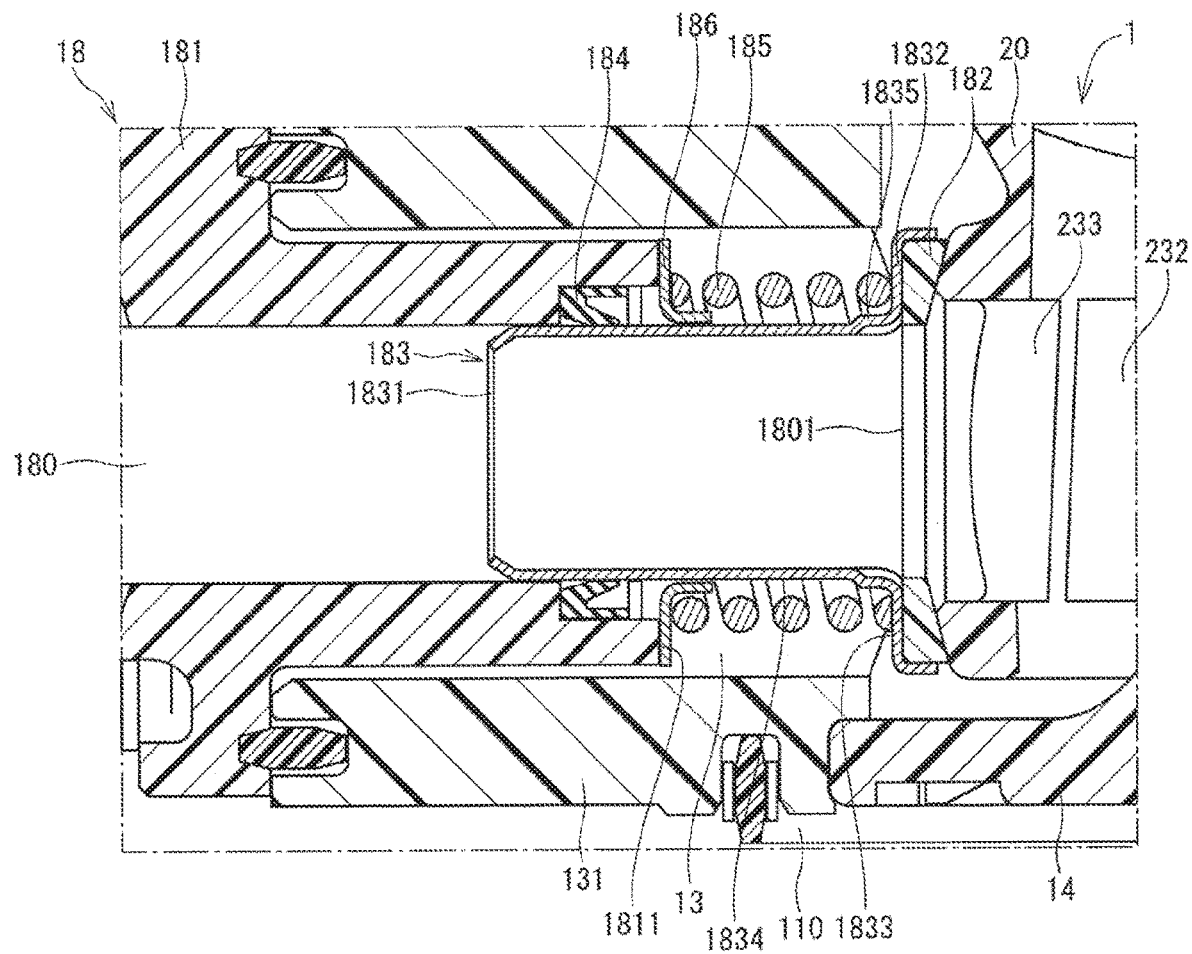
FIG. 28 is a partial cross-sectional view of a valve device according to another embodiment.

Furthermore, in the modification shown in FIG. 28, the shape of the sleeve is different from that of the first embodiment. Specifically, an adjacent part 1835 of the sleeve 183, which is adjacent to the end part 1832 of the sleeve 183, is radially outwardly expanded.

Even in the modifications shown in FIGS. 27 and 28, like in the above embodiments, the radial movement of the spring 185 can be limited while maintaining the inner diameter of the spring 185.

Figure 29:
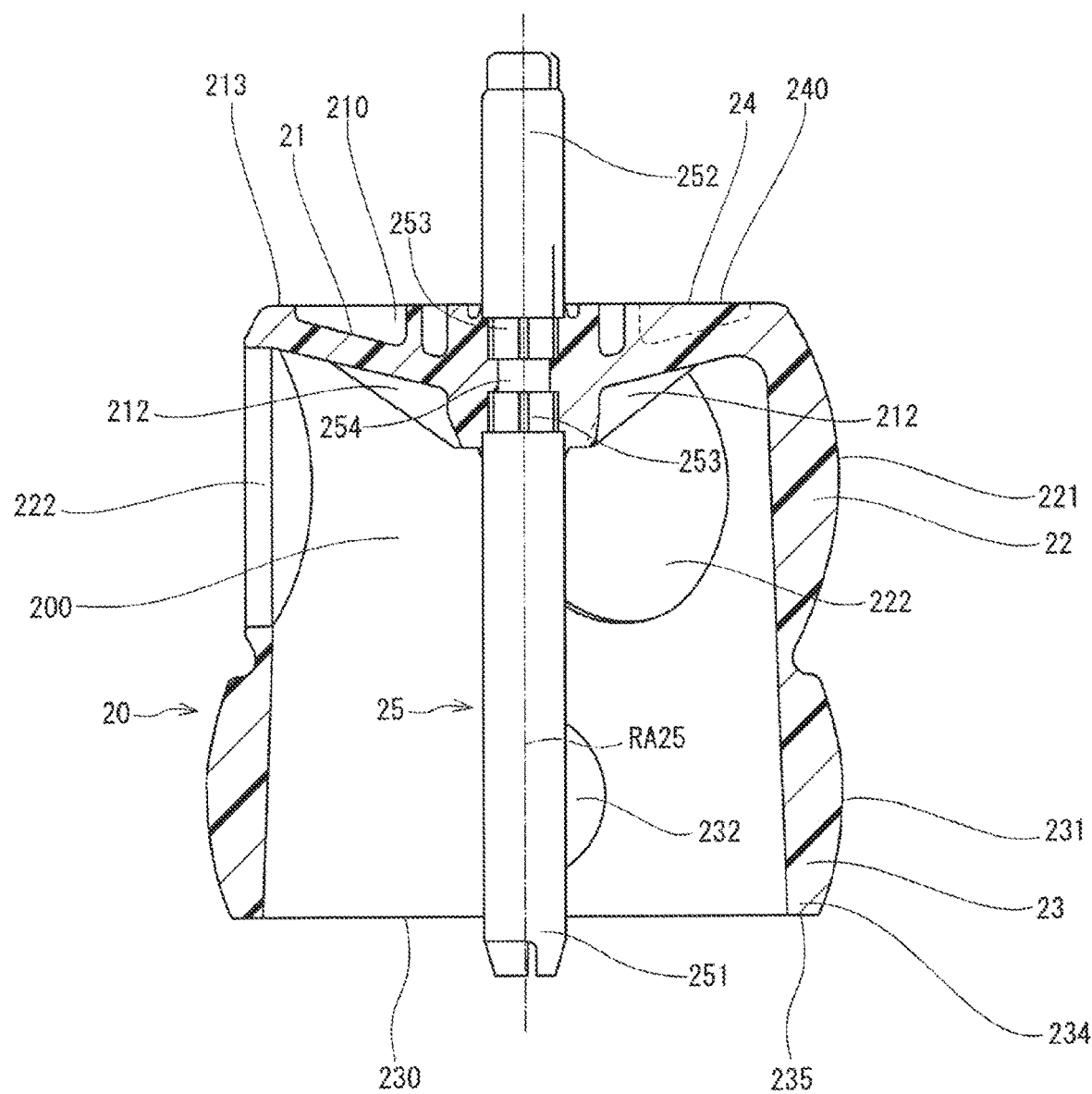
FIG. 29 is a cross-sectional view of a valve member of a valve device according to another embodiment.
Figure 30:
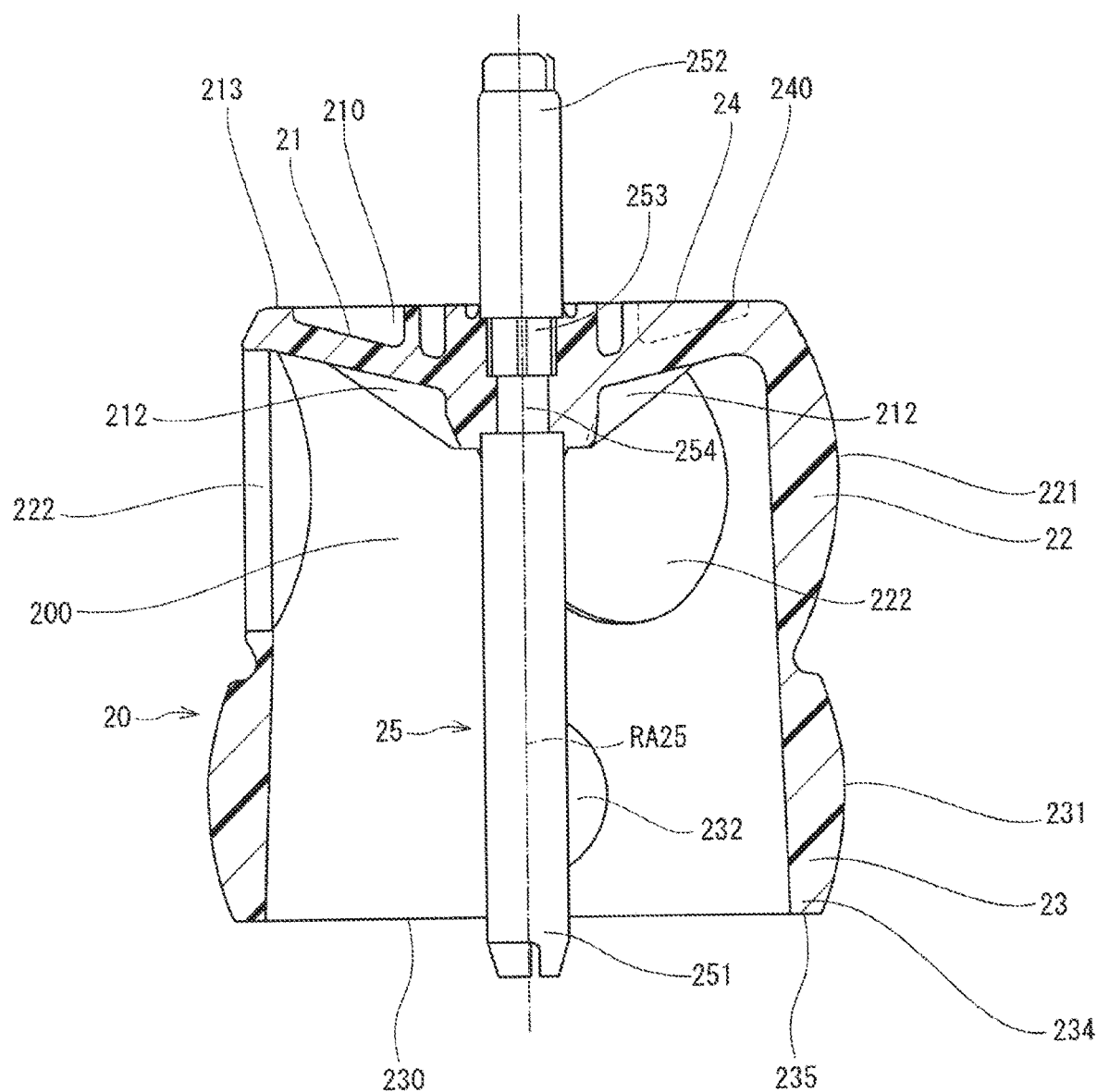
FIG. 30 is a cross-sectional view of a valve member of a valve device according to another embodiment.

In the above embodiments, the shaft includes the insert portion and the two grooves while the two grooves are respectively provided on the two opposite sides of the insert portion. However, the positional relationship between the insert portion and the grooves should not be limited to the above-described relationship. FIGS. 29 and 30 show modifications of the shape of the shaft.

In the modification shown in FIG. 29, the shaft 25 includes two insert portions 253. One of the insert portions 253 is located on the other end part 252 side of the one end part 251, and the other one of the insert portions 253 is located on the one end part 251 side of the other end part 252. A cross section of each insert portion 253, which is substantially perpendicular to the rotational axis RA25, is shaped into a polygonal form. At this time, the groove 254 is formed between the two insert portions 253.

In the modification shown in FIG. 30, the shaft 25 includes an insert portion 253 located on the other end part 252 side of the one end part 251. A cross section of the insert portion 253, which is substantially perpendicular to the rotational axis RA25, is shaped into a polygonal form. At this time, the groove 254 is formed between the insert portion 253 and the other end part 252. Furthermore, in a modification of the shaft 25 shown in FIG. 30, the insert portion 253 may be formed on the one end part 251 side of the other end part 252, and the groove 254 may be formed between the insert portion 253 and the one end part 251.

Even in the modification shown in FIGS. 29 and 30, similar to the above embodiments, the damage of the valve member 20 can be limited.

In the first embodiment, the limiter is formed integrally with the first housing in one piece. Alternatively, the limiter may be formed separately from the first housing.

In the first, fourth and fifth embodiments, the recess is formed such that the depth of the recess is progressively reduced from the center part of the valve member bottom, at which the shaft is placed, toward the radially outer side. However, the shape of the recess should not be limited to this shape. The recess may have a constant depth. In this case, the surface area of the side surface is increased by increasing the depth of the recess, so that a damage of the contact portion can be limited.

In the first to fifth embodiments, each of the valve-member-side openings of the first tubular portion is configured to communicate with the radiator passage. The one of the valve-member-side openings of the second tubular portion is configured to communicate with the oil cooler passage, and the other one of the valve-member-side openings of the second tubular portion is configured to communicate with the air conditioning passage. However, the communicating relationships among the valve-member-side openings and the above-described passages should not be limited to the above-described ones. For instance, one of the valve-member-side openings may be communicated with two of the passages. Also, one of the valve-member-side openings may be communicated with one or another one of two of the passages according to the rotational angle of the valve member.

In the above embodiments, the valve member bottom includes the ribs that are formed at the surface of the valve member bottom, which is located on the side where the space of the valve member is placed, such that in the view taken from the rotational axis, the ribs are radiated to extend radially outward. However, the configuration of the ribs should not be limited to the above one.

Figure 31:
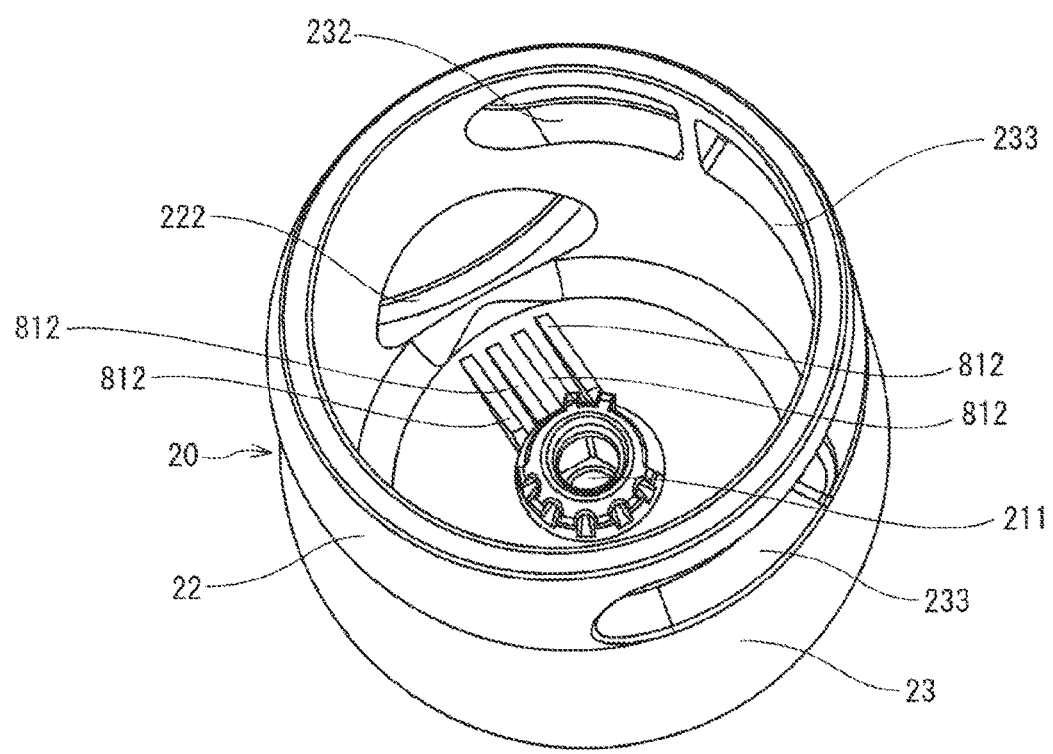
FIG. 31 is a perspective view of a valve member of a valve device according to another embodiment.
Figure 32:
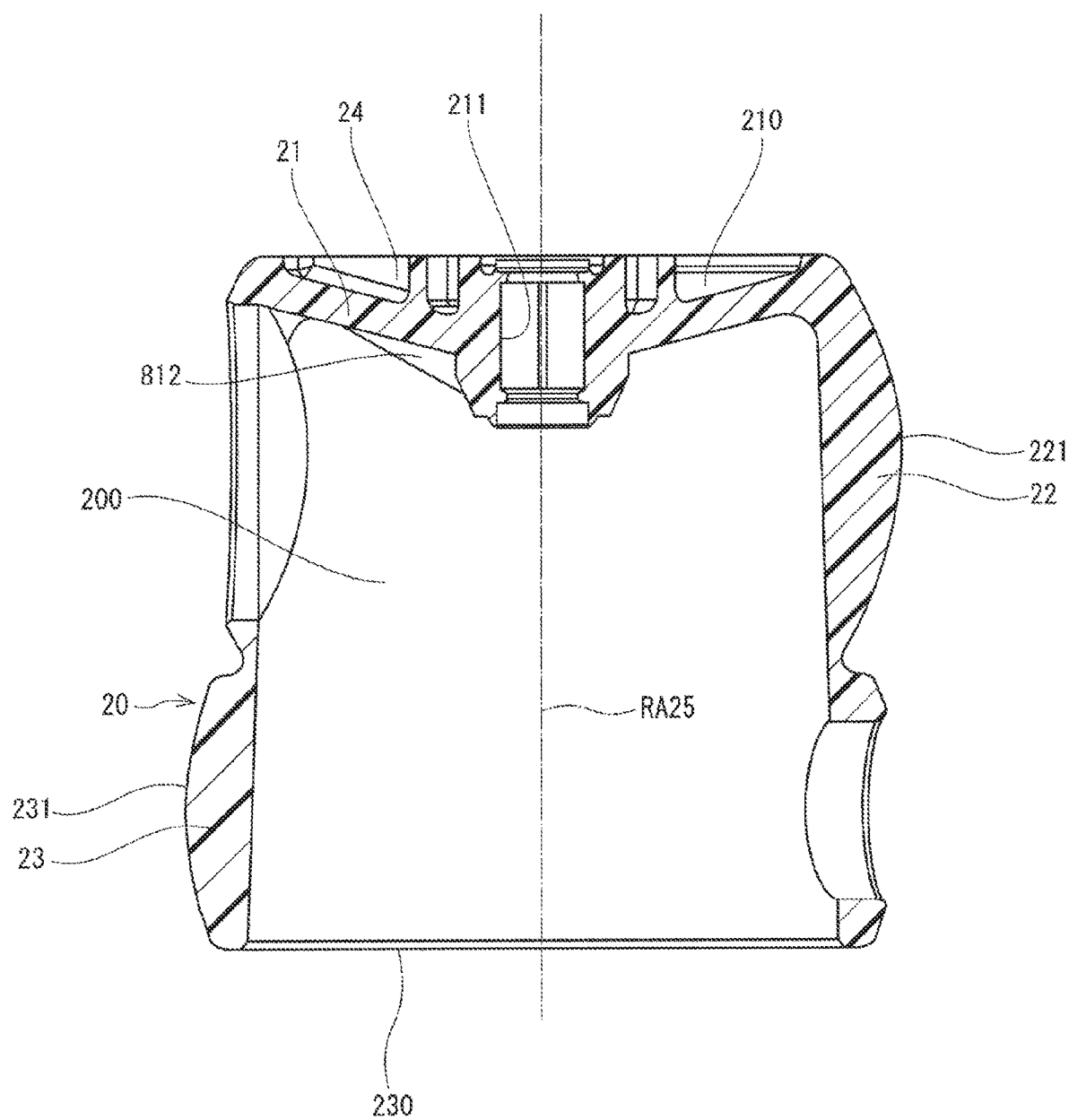
FIG. 32 is a cross-sectional view of the valve member of the valve device according to the other embodiment.

FIG. 31 is a perspective view of a valve member that has a plurality of ribs that are configured differently from the ribs of the first embodiment. Furthermore, FIG. 32 shows a cross-sectional view that includes the rotational axis RA25 of the valve member shown in FIG. 31.

As shown in FIG. 31, in the valve member 20, the ribs 812 are formed at the surface of the valve member bottom 21 located on the side where the space 200 is placed, such that the ribs 812 extend from the rotational axis RA25 side toward the valve-member-side opening 222. The ribs 812 are parallel to each other. In this way, like the ribs 212 of the first embodiment, the coolant, which flows in the space 200, can be smoothly guided from the center part of the valve member bottom 21 toward the radially outer side, and the strength of the valve member bottom 21 can be improved.

The contact portion of the fourth embodiment may be formed at the location of the contact portion of the fifth embodiment.

The present disclosure should not be limited to the above embodiments and may be implemented in various other forms without departing from the scope of the present disclosure.

The present disclosure has been described based on the embodiments. However, the present disclosure should not be limited to the above embodiments and the structure discussed in the above embodiments. The present disclosure should cover various modifications and other modifications within a scope of equivalence. Also, various combinations and forms as well as combinations and forms including only one or more or less of the elements should be within the scope and principle of the present disclosure.

What is claimed is:

1. A valve device comprising:
   a valve housing that has an inside space and a plurality of housing-side openings, wherein the plurality of housing-side openings communicates between the inside space and an outside of the valve housing;
   a valve member that is rotatably received in the valve housing and has:
      a plurality of valve-member-side openings, each of which is configured to communicate with a corresponding one of the plurality of housing-side openings; and
      a communication passage, through which the plurality of valve-member-side openings is communicated with each other;
   a limiter that is configured to limit rotation of the valve member;
   a contact portion that is provided in a space of the valve member and is configured to contact the limiter in a circumferential direction to limit the rotation of the valve member; and
   a shaft that rotatably supports the valve member, wherein the limiter is axially immovable relative to the contact portion along a rotational axis of the shaft.

2. The valve device according to claim 1, wherein:
   the valve member is shaped into a bottomed tubular form;
   the shaft is placed such that the rotational axis of the shaft coincides with a central axis of the valve member;

one valve-member-side opening among the plurality of valve-member-side openings is communicated with one housing-side opening among the plurality of housing-side openings and opens at one end part of the valve member in a direction along the rotational axis;

at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valve-member-side opening is formed at an outer peripheral wall of the valve member;

the space of the valve member, in which the contact portion is provided, is a recess that is recessed at a valve member bottom of the valve member, which forms another end part of the valve member opposite from the one end part of the valve member in the direction along the rotational axis; and the limiter is formed at a portion of the valve housing that is opposed to the valve member bottom.

3. The valve device according to claim 2, wherein a depth of the recess is progressively reduced from a center part of the valve member bottom, at which the shaft is placed, toward a radially outer side.

4. The valve device according to claim 2, wherein:
the at least one remaining valve-member-side opening is a plurality of remaining valve-member-side openings; and when an adjacent valve-member-side opening, which is closest to the contact portion among the plurality of remaining valve-member-side openings, and the contact portion are projected onto an imaginary plane, which is perpendicular to the shaft, a projected figure of the contact portion, which is projected onto the imaginary plane, is formed at a location that is different from a location of a projected figure of the adjacent valve-member-side opening, which is projected onto the imaginary plane.

5. The valve device according to claim 2, wherein the valve member includes a plurality of ribs that are formed at an opposite side of the valve member bottom, which is opposite from the contact portion, while the plurality of ribs is radiated to extend radially outward from a center part of the valve member bottom, at which the shaft is placed, toward a radially outer side.

6. The valve device according to claim 5, wherein the valve member has the one valve-member-side opening at the opposite side of the valve member bottom, which is opposite from the contact portion.

7. The valve device according to claim 2, wherein the limiter is formed integrally with the valve housing in one piece.

8. The valve device according to claim 1, wherein:
the valve member is shaped into a bottomed tubular form;
the shaft is placed such that the rotational axis of the shaft coincides with a central axis of the valve member;
one valve-member-side opening among the plurality of valve-member-side openings is communicated with one housing-side opening among the plurality of housing-side openings and opens at one end part of the valve member in a direction along the rotational axis;
at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valve-member-side opening is formed at an outer peripheral wall of the valve member;
the space of the valve member, in which the contact portion is provided, is the communication passage; and
the limiter is formed at a bearing that is placed in the one valve-member-side opening and rotatably supports one end part of the shaft.

9. The valve device according to claim 8, wherein the contact portion is provided at a connecting member that couples between the one end part of the valve member and the shaft.

10. The valve device according to claim 8, wherein the contact portion is provided to the one end part of the valve member and projects radially inward from the one end part of the valve member.

11. The valve device according to claim 1, wherein a surface of the contact portion, which is configured to contact the limiter, and a surface of the limiter, which is configured to contact the contact portion, radially outwardly extend in a view taken from the rotational axis.

12. A valve device comprising:
a valve housing that has an inside space and a plurality of housing-side openings, wherein the plurality of housing-side openings communicates between the inside space and an outside of the valve housing;
a valve member that is rotatably received in the valve housing and has:
a plurality of valve-member-side openings, each of which is configured to communicate with a corresponding one of the plurality of housing-side openings; and
a communication passage, through which the plurality of valve-member-side openings is communicated with each other;
a limiter that is configured to limit rotation of the valve member;
a contact portion that is provided in a space of the valve member and is configured to contact the limiter; and
a shaft that rotatably supports the valve member, wherein:
the space of the valve member, in which the contact portion is provided, is a recess that is recessed at a valve member bottom, which is an end part of the valve member in a direction along a rotational axis of the shaft; and
a depth of a bottom surface of the recess is progressively reduced from a center part of the valve member bottom, at which the shaft is placed, toward a radially outer side.

13. The valve device according to claim 12, wherein:
the valve member is shaped into a bottomed tubular form;
the shaft is placed such that the rotational axis of the shaft coincides with a central axis of the valve member;
one valve-member-side opening among the plurality of valve-member-side openings is communicated with one housing-side opening among the plurality of housing-side openings and opens at one end part of the valve member in the direction along the rotational axis;
at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valvemember-side opening is formed at an outer peripheral wall of the valve member; and the limiter is formed at a portion of the valve housing that is opposed to the valve member bottom.

14. The valve device according to claim 13, wherein:
the at least one remaining valve-member-side opening is a plurality of remaining valve-member-side openings; and when an adjacent valve-member-side opening, which is closest to the contact portion among the plurality of remaining valve-member-side openings, and the contact portion are projected onto an imaginary plane, which is perpendicular to the shaft, a projected figure of the contact portion, which is projected onto the imaginary plane, is formed at a location that is different from a location of a projected figure of the adjacent valve-member-side opening, which is projected onto the imaginary plane.

15. The valve device according to claim 14, wherein when a line, which connects between a center of the contact portion centered in a circumferential direction of the shaft and a central axis of the valve member, is projected onto the imaginary plane, the line intersects with the projected figure of the adjacent valve-member-side opening.

16. The valve device according to claim 13, wherein the valve member includes a plurality of ribs that are formed at an opposite side of the valve member bottom, which is opposite from the contact portion, while the plurality of ribs is radiated to extend radially outward from a center part of the valve member bottom, at which the shaft is placed, toward a radially outer side.

17. The valve device according to claim 16, wherein the valve member has the one valve-member-side opening at the opposite side of the valve member bottom, which is opposite from the contact portion.

18. The valve device according to claim 12, wherein the limiter is formed integrally with the valve housing in one piece.

19. The valve device according to claim 12, wherein a surface of the contact portion, which is configured to contact the limiter, and a surface of the limiter, which is configured to contact the contact portion, radially outwardly extend in a view taken from the rotational axis.

20. The valve device according to claim 12, wherein the valve housing and the valve member are made of resin.

21. The valve device according to claim 12, wherein when the plurality of valve-member-side openings and the contact portion are projected onto an imaginary plane, which is perpendicular to the shaft, an overlapping range, in which projected figures of any two of the plurality of valve-member-side openings projected onto the imaginary plane overlap with each other, is displaced in a circumferential direction of the shaft from a range of a projected figure of the contact portion projected onto the imaginary plane.

22. The valve device according to claim 12, wherein:
the valve housing has:
a valve member receiving space, which is the inside space, while the valve member receiving space is substantially shaped into a columnar form and is configured to receive the valve member; and
an insertion hole, which is one of the plurality of housing-side openings and is communicated with the valve member receiving space;
the valve device comprises a bearing that is placed in the insertion hole and rotatably supports one end part of the shaft;
the bearing includes:
a center portion, which extends along the rotational axis of the shaft;
a ring portion, which is placed on a radially outer side of the center portion;
a plurality of connecting portions, each which connect between the center portion and the ring portion; and
a bearing portion, which rotatably supports the one end part of the shaft; and
each of the plurality of connecting portions is configured such that an axial length of the connecting portion, which is measured in a direction along the rotational axis, is progressively reduced in a radial direction away from the rotational axis.

23. The valve device according to claim 22, wherein:
the plurality of connecting portions is formed such that when the bearing is viewed in a direction along the rotational axis, an interval between each adjacent two of the plurality of connecting portions is set to have an identical angle; and
a gap, which is configured to conduct coolant through the gap, is formed between each adjacent two of the plurality of connecting portions.

24. The valve device according to claim 22, wherein an end part of each of the plurality of connecting portions, which is located on a side where the ring portion is placed, has a surface, which is located at one axial side in the direction along the rotational axis, is tapered such that the surface of the end part of the connecting portion is tilted relative to a radial direction.

25. The valve device according to claim 12, wherein the contact portion, which is configured to contact the limiter, is formed such that a part of the contact portion projects outward from the recess.

26. A valve device comprising:
a valve housing that has an inside space and a plurality of housing-side openings, wherein the plurality of housing-side openings communicates between the inside space and an outside of the valve housing;
a valve member that is rotatably received in the valve housing and has:
a plurality of valve-member-side openings, each of which is configured to communicate with a corresponding one of the plurality of housing-side openings; and
a communication passage, through which the plurality of valve-member-side openings is communicated with each other;
a limiter that is configured to limit rotation of the valve member;
a shaft that rotatably supports the valve member; and
a contact portion that is provided in a space of the valve member and is configured to contact the limiter, wherein a part of the contact portion projects outward from the space and projects beyond an end of the valve member in an axial direction of a rotation axis of the shaft.

27. The valve device according to claim 26, wherein:
the valve member is shaped into a bottomed tubular form;
the shaft is placed such that a rotational axis of the shaft coincides with a central axis of the valve member;
one valve-member-side opening among the plurality of valve-member-side openings is communicated with one housing-side opening among the plurality of housing-side openings and opens at one end part of the valve member in a direction along the rotational axis;
at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valve-member-side opening is formed at an outer peripheral wall of the valve member;

the space of the valve member, in which the contact portion is provided, is a recess that is recessed at a valve member bottom of the valve member, which forms another end part of the valve member opposite from the one end part of the valve member in the direction along the rotational axis; and the limiter is formed at a portion of the valve housing that is opposed to the valve member bottom.

28. The valve device according to claim 27, wherein a depth of the recess is progressively reduced from a center part of the valve member bottom, at which the shaft is placed, toward a radially outer side.

29. The valve device according to claim 27, wherein:
the at least one remaining valve-member-side opening is a plurality of remaining valve-member-side openings; and
when an adjacent valve-member-side opening, which is closest to the contact portion among the plurality of remaining valve-member-side openings, and the contact portion are projected onto an imaginary plane, which is perpendicular to the shaft, a projected figure of the contact portion, which is projected onto the imaginary plane, is formed at a location that is different from a location of a projected figure of the adjacent valve-member-side opening, which is projected onto the imaginary plane.

30. The valve device according to claim 29, wherein when a line, which connects between a center of the contact portion centered in a circumferential direction of the shaft and a central axis of the valve member, is projected onto the imaginary plane, the line intersects with the projected figure of the adjacent valve-member-side opening.

31. The valve device according to claim 27, wherein the valve member includes a plurality of ribs that are formed at an opposite side of the valve member bottom, which is opposite from the contact portion, while the plurality of ribs is radiated to extend radially outward from a center part of the valve member bottom, at which the shaft is placed, toward a radially outer side.

32. The valve device according to claim 31, wherein the valve member has the one valve-member-side opening at the opposite side of the valve member bottom, which is opposite from the contact portion.

33. The valve device according to claim 27, wherein the limiter is formed integrally with the valve housing in one piece.

34. The valve device according to claim 26, wherein a surface of the contact portion, which is configured to contact the limiter, and a surface of the limiter, which is configured to contact the contact portion, radially outwardly extend in a view taken from a rotational axis.

35. The valve device according to claim 26, wherein the valve housing and the valve member are made of resin.

36. The valve device according to claim 26, wherein when the plurality of valve-member-side openings and the contact portion are projected onto an imaginary plane, which is perpendicular to the shaft, an overlapping range, in which projected figures of any two of the plurality of valve-member-side openings projected onto the imaginary plane overlap with each other, is displaced in a circumferential direction of the shaft from a range of a projected figure of the contact portion projected onto the imaginary plane.

37. The valve device according to claim 26, wherein:
the valve housing has:
a valve member receiving space, which is the inside space, while the valve member receiving space is substantially shaped into a columnar form and is configured to receive the valve member; and
an insertion hole, which is one of the plurality of housing-side openings and is communicated with the valve member receiving space;
the valve device comprises a bearing that is placed in the insertion hole and rotatably supports one end part of the shaft;
the bearing includes:
a center portion, which extends along a rotational axis of the shaft;
a ring portion, which is placed on a radially outer side of the center portion;
a plurality of connecting portions, each which connect between the center portion and the ring portion; and
a bearing portion, which rotatably supports the one end part of the shaft; and
each of the plurality of connecting portions is configured such that an axial length of the connecting portion, which is measured in a direction along the rotational axis, is progressively reduced in a radial direction away from the rotational axis.

38. The valve device according to claim 37, wherein:
the plurality of connecting portions is formed such that when the bearing is viewed in a direction along the rotational axis, an interval between each adjacent two of the plurality of connecting portions is set to have an identical angle; and
a gap, which is configured to conduct coolant through the gap, is formed between each adjacent two of the plurality of connecting portions.

39. The valve device according to claim 37, wherein an end part of each of the plurality of connecting portions, which is located on a side where the ring portion is placed, has a surface, which is located at one axial side in the direction along the rotational axis, is tapered such that the surface of the end part of the connecting portion is tilted relative to a radial direction.

40. The valve device according to claim 26, wherein:
the space of the valve member, in which the contact portion is provided, is a recess that is recessed at a valve member bottom, which is an end part of the valve member in a direction along a rotational axis of the shaft; and
the part of the contact portion, which is configured to contact the limiter, projects outward from the recess.

41. The valve device according to claim 40, wherein a depth of the recess is constant.

42. The valve device according to claim 26, wherein the limiter is substantially shaped in an arcuate form and is formed at an end surface of the valve housing that is opposed to a valve member bottom of the valve member.

43. The valve device according to claim 26, wherein the contact portion has two side walls that radially outwardly extend in a view taken from a rotational axis of the shaft.

44. A cooling system comprising:
the valve device of claim 26;
a radiator that is configured to conduct coolant to be circulated through the valve device;
an oil cooler that is configured to conduct the coolant to be circulated through the valve device; and air conditioning heat exchanger that is configured to conduct the coolant to be circulated through the valve device.

45. A valve device comprising:
a valve housing that has an inside space and a plurality of housing-side openings, wherein the plurality of housing-side openings communicates between the inside space and an outside of the valve housing; and
a valve member that is rotatably received in the valve housing and has:
  a plurality of valve-member-side openings, each of which is configured to communicate with a corresponding one of the plurality of housing-side openings;
  a communication passage, through which the plurality of valve-member-side openings is communicated with each other;
  a valve member bottom, which is placed in the inside space at a location where the valve member bottom is opposed to a bottom of the valve housing; and
  a guide member that is configured to guide coolant, which flows in the communication passage, from a center part of the valve member bottom toward a radially outer side along the valve member bottom;
a shaft that rotatably supports the valve member, wherein the guide member axially projects from the valve member bottom on an axial side that is opposite to the bottom of the valve housing in an axial direction of a rotational axis of the shaft, and the guide member has a guide surface that axially extends in the axial direction and radially extends in a radial direction of the shaft; and
a limiter that is configured to limit rotation of the valve member;
wherein the limiter and the guide member are positioned on opposite sides of the valve member bottom.

46. The valve device according to claim 45, further comprising:
a contact portion that is provided in a space of the valve member and is configured to contact the limiter.

47. The valve device according to claim 46, wherein:
the valve member is shaped into a bottomed tubular form;
the shaft is placed such that the rotational axis of the shaft coincides with a central axis of the valve member;
one valve-member-side opening among the plurality of valve-member-side openings is communicated with one housing-side opening among the plurality of housing-side openings and opens at one end part of the valve member in a direction along the rotational axis;
at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valve-member-side opening is formed at an outer peripheral wall of the valve member;
the space of the valve member, in which the contact portion is provided, is a recess that is recessed at the valve member bottom of the valve member, which forms another end part of the valve member opposite from the one end part of the valve member in the direction along the rotational axis; and
the limiter is formed at a portion of the valve housing that is opposed to the valve member bottom.

48. The valve device according to claim 47, wherein a depth of the recess is progressively reduced from a center part of the valve member bottom, at which the shaft is placed, toward a radially outer side.

49. The valve device according to claim 47, wherein:
the at least one remaining valve-member-side opening is a plurality of remaining valve-member-side openings; and
when an adjacent valve-member-side opening, which is closest to the contact portion among the plurality of remaining valve-member-side openings, and the contact portion are projected onto an imaginary plane, which is perpendicular to the shaft, a projected figure of the contact portion, which is projected onto the imaginary plane, is formed at a location that is different from a location of a projected figure of the adjacent valve-member-side opening, which is projected onto the imaginary plane.

50. The valve device according to claim 49, wherein when a line, which connects between a center of the contact portion centered in a circumferential direction of the shaft and a central axis of the valve member, is projected onto the imaginary plane, the line intersects with the projected figure of the adjacent valve-member-side opening.

51. The valve device according to claim 47, wherein the valve member includes a plurality of ribs that are formed at an opposite side of the valve member bottom, which is opposite from the contact portion, while the plurality of ribs is radiated to extend radially outward from a center part of the valve member bottom, at which the shaft is placed, toward a radially outer side.

52. The valve device according to claim 51, wherein the valve member has the one valve-member-side opening at the opposite side of the valve member bottom, which is opposite from the contact portion.

53. The valve device according to claim 47, wherein the limiter is formed integrally with the valve housing in one piece.

54. The valve device according to claim 46, wherein:
the valve member is shaped into a bottomed tubular form;
the shaft is placed such that the rotational axis of the shaft coincides with a central axis of the valve member;
one valve-member-side opening among the plurality of valve-member-side openings is communicated with one housing-side opening among the plurality of housing-side openings and opens at one end part of the valve member in a direction along the rotational axis;
at least one remaining valve-member-side opening, which is other than the one valve-member-side opening among the plurality of valve-member-side openings, is configured to communicate with at least one remaining housing-side opening, which is other than the one housing-side opening among the plurality of housing-side openings, while the at least one remaining valve-member-side opening is formed at an outer peripheral wall of the valve member;
the space of the valve member, in which the contact portion is provided, is the communication passage; and
the limiter is formed at a bearing that is placed in the one valve-member-side opening and rotatably supports one end part of the shaft.

55. The valve device according to claim 54, wherein the contact portion is provided at a connecting member that couples between the one end part of the valve member and the shaft.

56. The valve device according to claim 54, wherein the contact portion is provided to the one end part of the valve member and projects radially inward from the one end part of the valve member.

57. The valve device according to claim 46, wherein a surface of the contact portion, which is configured to contact the limiter, and a surface of the limiter, which is configured to contact the contact portion, radially outwardly extend in a view taken from the rotational axis.

58. The valve device according to claim 46, wherein when the plurality of valve-member-side openings and the contact portion are projected onto an imaginary plane, which is perpendicular to the shaft, an overlapping range, in which projected figures of any two of the plurality of valve-member-side openings projected onto the imaginary plane overlap with each other, is displaced in a circumferential direction of the shaft from a range of a projected figure of the contact portion projected onto the imaginary plane.

59. The valve device according to claim 46, wherein:
the valve housing has:
 a valve member receiving space, which is the inside space, while the valve member receiving space is substantially shaped into a columnar form and is configured to receive the valve member; and
 an insertion hole, which is one of the plurality of housing-side openings and is communicated with the valve member receiving space;
the valve device comprises a bearing that is placed in the insertion hole and rotatably supports one end part of the shaft;
the bearing includes:
 a center portion, which extends along the rotational axis of the shaft;
 a ring portion, which is placed on a radially outer side of the center portion;
 a plurality of connecting portions, each which connect between the center portion and the ring portion; and
 a bearing portion, which rotatably supports the one end part of the shaft; and
each of the plurality of connecting portions is configured such that an axial length of the connecting portion, which is measured in a direction along the rotational axis, is progressively reduced in a radial direction away from the rotational axis.

60. The valve device according to claim 59, wherein:
the plurality of connecting portions is formed such that when the bearing is viewed in a direction along the rotational axis, an interval between each adjacent two of the plurality of connecting portions is set to have an identical angle; and
a gap, which is configured to conduct coolant through the gap, is formed between each adjacent two of the plurality of connecting portions.

61. The valve device according to claim 59, wherein an end part of each of the plurality of connecting portions, which is located on a side where the ring portion is placed, has a surface, which is located at one axial side in the direction along the rotational axis, is tapered such that the surface of the end part of the connecting portion is tilted relative to a radial direction.

62. The valve device according to claim 46, wherein:
the space of the valve member, in which the contact portion is provided, is a recess that is recessed at the valve member bottom, which is an end part of the valve member in a direction along the rotational axis of the shaft; and
a part of the contact portion, which is configured to contact the limiter, projects outward from the recess.

63. The valve device according to claim 62, wherein a depth of the recess is constant.

64. The valve device according to claim 46, wherein the guide member is located on a side of the valve member bottom, which is opposite to the contact portion.

65. The valve device according to claim 46, wherein the guide member and the contact portion are placed at a location where the guide member and the contact portion overlap with each other in a view taken from the rotational axis.

66. The valve device according to claim 46, wherein the limiter is substantially shaped in an arcuate form and is formed at a surface of the valve housing that is opposed to the valve member bottom.

67. The valve device according to claim 46, wherein:
the limiter has two side surfaces that are arranged one after another in a circumferential direction; and
each of the two side surfaces radially outwardly extends in a view taken from the rotational axis of the shaft.

68. The valve device according to claim 46, wherein:
the limiter projects from a surface of the valve housing, which is opposed to the valve member bottom, toward the valve member bottom; and
a projecting height of the limiter, which is measured from the surface of the valve housing, is progressively increased from a radially outer side toward a radially inner side of the valve member.

69. The valve device according to claim 45, wherein the valve housing and the valve member are made of resin.

70. The valve device according to claim 45, wherein the guide member radially outwardly extends in a view taken from the rotational axis.

71. The valve device according to claim 45, wherein the guide member radially outwardly extends in a direction, which is directed from the rotational axis toward one of the plurality of valve-member-side openings.

72. The valve device according to claim 45, wherein the guide member radially outwardly extends in a direction, which is directed from the rotational axis toward a closest one of the plurality of valve-member-side openings, which is closest to the valve member bottom.

73. The valve device according to claim 45, wherein:
the valve member bottom has the guide member placed on one radial side of the rotational axis where a closest one of the plurality of valve-member-side openings, which is closest to the valve member bottom, is placed; and
the valve member bottom has a region, in which the guide member is absent, on another radial side of the rotational axis that is opposite to the closest one of the plurality of valve-member-side openings, which is closest to the valve member bottom.

* * * * *